(12) United States Patent
Jin et al.

(10) Patent No.: US 7,996,685 B2
(45) Date of Patent: Aug. 9, 2011

(54) METHOD FOR EFFECTIVE TAMPER RESISTANCE

(75) Inventors: Hongxia Jin, San Jose, CA (US); Jeffrey Bruce Lotspiech, Henderson, NV (US); Ginger M. Myles, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 12/135,052

(22) Filed: Jun. 6, 2008

(65) Prior Publication Data

US 2009/0049308 A1    Feb. 19, 2009

Related U.S. Application Data

(63) Continuation of application No. 11/613,001, filed on Dec. 19, 2006.

(51) Int. Cl.
   *G06F 21/00* (2006.01)
(52) U.S. Cl. .......... 713/189; 713/187; 713/194
(58) Field of Classification Search ............ 713/156, 713/187, 194
   See application file for complete search history.

(56) References Cited

U.S. PATENT DOCUMENTS

| 6,330,549 B1* | 12/2001 | Merkle .......... 713/156 |
| 2004/0123116 A1* | 6/2004 | Jin et al. .......... 713/187 |
| 2005/0005103 A1 | 1/2005 | Atkin et al. |
| 2005/0039022 A1 | 2/2005 | Venkatesan et al. |
| 2005/0050332 A1 | 3/2005 | Serret-Avila et al. |
| 2005/0081042 A1 | 4/2005 | Venkatesan et al. |
| 2005/0105738 A1 | 5/2005 | Hashimoto |
| 2005/0144458 A1 | 6/2005 | Venkatesan et al. |
| 2005/0166069 A1 | 7/2005 | Hashimoto et al. |
| 2005/0183072 A1 | 8/2005 | Horning et al. |

\* cited by examiner

*Primary Examiner* — Vivek Srivastava
*Assistant Examiner* — Thong Truong
(74) *Attorney, Agent, or Firm* — Leonard T. Guzman; Mohammed Kashef

(57) ABSTRACT

A system, method, and computer program product for preventing a malicious user from analyzing and modifying software content. The one-way functions used in prior art systems using dynamically evolving audit logs or self-modifying applications are replaced with a one-way function based on group theory. With this modification, untampered key evolution will occur inside a defined mathematical group such that all valid key values form a subgroup. However, if the program is altered, the key will evolve incorrectly and will no longer be a member of the subgroup. Once the key value is outside of the subgroup, it is not possible to return it to the subgroup. The present invention provides a limited total number of valid keys. The key evolution points are not restricted to locations along the deterministic path, so the key can be used in various novel ways to regulate the program's behavior, including in non-deterministic execution paths.

29 Claims, 20 Drawing Sheets

FIG. 12 (PRIOR ART)

```
        push ebp                          push ebp
        mov ebp, esp                      mov ebp, esp
        push ecx                          push ecx
        mov dword ptr[ebp-04h],0h         mov dword ptr[ebp-04h],0h
        jmp 1.2 ─────────────────────▶    call branch_function_1
L1:                                  820
        mov eax, [ebp-04h]                mov eax, [ebp-04h]
        add eax, 01h                      add eax, 01h
        mov [ebp-04h], eax                mov [ebp-04h], eax
L2:
        cmp dword ptr [ebp-04h], 05h      cmp dword ptr [ebp-04h], 05h
        jge L3 ──────────────────────▶    call branch_function_2
        mov ecx, [ebp-04h]           830  mov ecx, [ebp-04h]
        push ecx                          push ecx
        push "this is i"                  push "this is i"
        call printf ─────────────────▶    call branch_function_3
        add esp, 08h                 840  add esp, 08h
        jmp L1 ──────────────────────▶    call branch_function_1
L3:                                  850
        mov esp, ebp                      mov esp, ebp
        pop ebp                           pop ebp
        ret                               ret
```

METHOD FOR EFFECTIVE TAMPER RESISTANCE

CROSS-REFERENCE TO RELATED APPLICATIONS

This application is a continuation of application Ser. No. 11/613,001 filed on Dec. 19, 2006, which is incorporated herein by reference in its entirety.

This invention is related to commonly-owned pending U.S. patent applications, each of which is hereby incorporated by reference:

U.S. Ser. No. 10/249,130, filed Dec. 19, 2002, entitled "System and Method to Proactively Detect Software Tampering", published Jun. 24, 2004 as USPA 2004/0123116A1 and referred to hereafter as the '130 invention or the Event-Log Based invention.

U.S. Ser. No. 11/066,934, filed Feb. 26, 2005, entitled "System, Method, and Service for Detecting Improper Manipulation of an Application", referred to hereafter as the '934 invention or the Branch-Based invention.

FIELD OF THE INVENTION

This invention relates generally to the field of software security and more specifically to preventing a malicious user from analyzing and modifying software content.

BACKGROUND OF THE INVENTION

Whenever software is sold, there is the possibility that a malicious user will tamper with the software to extract secret keys or algorithms. The intellectual property contained in and protected by software is regularly attacked, often with malicious intent. Software tamper resistance can be addressed either through the use of specialized hardware or by incorporating features in the software itself which make it more difficult to reverse engineer. Tradeoffs must be made with each approach. Hardware-based techniques such as dongles, smartcards, and other types of secure processors have the potential to provide a higher level of protection, but they are generally more expensive to produce and cumbersome for the end user. Because specialized hardware is not widely used for general computing purposes, hardware-based approaches often prove infeasible for that market. Also, such an approach may be infeasible when software is distributed via the Internet.

Software-based tamperproofing approaches, while easier to implement, are not generally focused on an absolute solution, i.e., a protection mechanism which is undefeatable. Because the attacker has full control over the execution environment, it is believed that given enough time, effort, and/or resources, a sufficiently determined attacker can completely break any piece of software. Instead, software-based protection techniques focus on increasing the time, effort, and/or resources required by an attacker to break the software. Such an approach may eliminate some classes of attackers but does not prevent a sufficiently determined and skilled attacker. Thus, tamper resistance technologies take the approach of limiting the number of attackers.

One common attack involves the modification of software with the goal of circumventing software protection technologies. This attack sometimes occurs where a software developer has distributed a trial version of their program. The trial software can generally only be used for a specified number of days or executions. Normally, the time passed or usage recording is automatically performed within the software. To circumvent the check, the attacker has to modify the software. Once the check is bypassed, the attacker has obtained unlimited use of the software either at a significantly discounted price or, more commonly, for free. To further compound the attack, the modified software could be redistributed by the attacker for free or for a profit. The music and movie industries also rely on software-based digital rights management technologies to protect their copyrighted material. Such content protection can often be bypassed through malicious software tampering and reverse engineering. To address these issues, considerable research has focused on the development of tamper resistant technologies.

Most intrusion detection mechanisms are used after the damage is done and, thus, are reactive. The term "proactive security" refers to the detection of what goes wrong during a process, such as an execution of software before the final damage is done. Most prior art systems don't provide for a proactive security mechanism to combat reverse-engineering of software; they don't identify the evidence hackers (e.g. malicious users) leave behind during a reverse-engineering attempt. The term "user" is used herein to refer to an operator of an untrusted computer (e.g., set-top box, PC, PDA, video game console, etc.), who could try to tamper with the software code (such as software code related to web browser programs, sound card drivers, game console programs, Java® applets, or macros embedded in multimedia content such as images, music, or video files). There is thus a need to proactively detect (and thereby prevent real damage from occurring) an on-going reverse-engineering process before hackers succeed in the tampering and before they gain access to important information such as secret keys.

Another relevant concept is "forward security" which is a formal property that has been identified and appears in security literature. Forward security includes methods of preventing corruption of past code or logs after tampering has occurred. Future actions may be untrusted, but preexisting trusted items remain uncompromised.

Early on, many techniques were proposed with little or no attention paid to the evaluation of the technique with respect to an attacker or established threat model. A shift in focus began with a group led by Collberg who evaluated software watermarking algorithms based on a threat model and a defined set of properties [4, 15, 16, 18]. More recently, researchers have begun to examine the issue of software protection from the attacker's point of view by proposing attacks against published tamper resistance techniques [14, 21, 22] and the development of a disassembler which is more resistant to code obfuscation [11].

A variety of different software-based defenses have been proposed such as software watermarking [5, 17, 19, 23], code obfuscation [6, 12, 20, 24], and tamper resistance. One of the first tamper resistance algorithms published was by Aucsmith [1]. This algorithm is based on Integrity Verification Kernels (IVK) which are units of code responsible for performing critical program functions. Each IVK is split into smaller blocks of code which are individually encrypted. To detect tampering, at each step, the sum of the hashes of all previously executed blocks is checked to verify that the blocks were executed correctly and in proper order. Additional tamper resistance techniques have been proposed by Chang and Atallah [2], Horne, et al. [8], and Chen, et al. [3].

One way of watching for abnormalities that might indicate hacking is by maintaining an "audit log". In this scenario, one needs to identify the information that needs to be put into the log for detection and the verification process that should follow. The term "log" thus refers here to an audit trail using a set of entries describing what happens with regard to execution of software code. Making the information in the log satisfy certain properties can at times not only make the scheme more efficient (in terms of reducing log size and creating a more efficient verification), but can also guarantee the verification process and detect the target anomaly.

Two software-based tamper resistance techniques, proposed by Jin and Lotspiech [9] and Jin, et al. [10], based on a common key evolution mechanism are discussed below. The techniques offer many advantages over previous software-based algorithms, but they still contain weaknesses which can be exploited by an attacker.

Event Log-Based Tamper Resistance

As an initial tamper detection technique, Jin and Lotspiech developed a method which provides software protection in an online environment through the use of an event log [9]. The event log is similar in concept to the traditional audit log. In short, the Event-Log Based invention proactively detects software tampering by using key evolution to produce a dynamically evolving audit log. The key values are evolved from an initial value based upon a one-way function depending on both the previous log entry and the previous key. As the program executes, specific execution events are recorded in the log. The event log is then transmitted to a clearing house where it is examined. The overall goal of the technique is to detect the ongoing, minor program alterations before the attacker has succeeded in disabling the tamper detection mechanism.

Because the log potentially contains evidence of tampering, it also becomes a target of attack. Therefore, in this scenario, the audit trail itself needs to be protected such that there is no way for a hacker to undetectably delete any old entries in the trail. There is a possibility that the hacker will eventually completely understand the logging mechanism, and from that point on the new entries in the trail cannot be trusted.

Specifically, to enable the construction of an event log, the original program is modified, incorporating integrity check code. In one embodiment, a key $k_i$ is advanced each time an integrity check is performed using a one-way function $f_1$, so that $k_{i+1}=f_1(k_i)$. The new key $k_{i+1}$ and the integrity check value $v_{i+1}$ are then combined using another function $f_2$, so that entry $e_{i+1}=f_2(k_{i+1}, v_{i+1})$. The resulting value $e_{i+1}$ is then recorded in the log along with $v_{i+1}$. See prior art FIG. 1. Alternatively, the key evolution process could incorporate the integrity check value. In this case, the one-way function f uses both the current key $k_i$ and the current integrity check value $v_i$ to generate a new key $k_{i+1}=f(k_i, v_i)$. See prior art FIG. 2.

As the program executes, the inserted integrity check code is triggered and the result from the integrity check is recorded in the log. The log entries may include a checksum computation based upon a section of software code, for example. A change in the checksum value indicates the program has been modified. Alternatively, to detect the presence of a debugger, the elapsed time to execute a sequence of instructions can be measured. If the measured time exceeds a present threshold, it is highly likely the program is being run using a debugger.

Upon connection to a network, the final key $k_n$ and the log are transmitted back to the clearinghouse. The clearinghouse performs the same key evolution to verify the integrity check values and the final key $k_n$. The tampering verification/detection process can then be a simple comparison between the returned log and the correct information that the clearinghouse has computed using the same evolving key. If the untrusted user substitutes an old valid log, the keys will not be correct. If the user submits a truncated log, then the next time the log is transmitted, the keys will not be correct.

The Event-Log Based invention thus applies the "forward security" property to integrity checks during software execution to proactively detect the software tampering process. Any truncation of the log, deletion of the log, or substitution of an old valid log is easily detected when the user connects to get new content. It is assumed that before the hacker completely understands a specific software program, he or she will have triggered many "integrity check" failures that will have been logged. A hacker is therefore probably unable to reverse-engineer the software without being detected.

The Event-Log Based invention can respond to detected tampering in many ways, including revoking a software user's device keys, increasing the number and variety of types of integrity checks in software code or content sent to a user, increasing the frequency of periodic transmission of the audit log and final key, and advising a system administrator regarding said detected tampering. The administrator can choose to merely pay more attention to the same user the next time or choose to give a warning to the user. Alternately, when enough tampering evidence is accumulated, the user can be disconnected from the network and disallowed from receiving new content distribution in the future.

As with any detection mechanism based on an audit log, a main concern is the size of the log. In the two examples presented above the entire log must be transmitted to the clearing house. It is not hard to imagine applications in which the log will become very large between connections. The main reason that the entire log must be transmitted to the clearing house is that even though the correct values for the integrity checks are known, the particular order that they will be executed is not known. To address this issue, Jin and Lotspiech proposed an alternate means of incorporating forward security. Instead of embedding the integrity checks throughout the program, their locations are restricted to points that are encountered along all executions paths through the program. In this scheme, the clearing house knows exactly which integrity checks are invoked and in which order. With this knowledge, the clearing house can evolve the key using the initial key, thus, only the final key $k_n$ needs to be transmitted. See prior art FIG. 3. The log entries may be wrapped around to save space, or may be designed to consistently produce only a single value upon proper software execution. The use of secure tamper-resistant hardware for key storage can further strengthen the scheme.

The Event Log-Based technique has three major identified limitations. The first limitation is the need for a periodic online connection. Such an approach may be suitable for a business scenario in which the customer wishes to maintain an ongoing relationship with the service provider. For example, consider a customer who buys a music player and also wishes to buy music from an associated online music store. When the customer makes the connection to the music store, the log can be transmitted piggyback to the clearing house. Tampering can be detected at this time, and access to the music store can be prevented. However, an attacker who does not care about using the associated music store can simply prevent the connection, and tampering will go undetected. This makes it possible for an attacker to disable the integrity checks and distribute an unprotected version of the software.

The second limitation relates to an assumption made when designing the protection mechanism. This assumption is that the attacker will trigger at least one integrity check value which is detected by the clearing house before the software is completely understood. In reality, it is difficult to achieve forward security on a client machine that is under the complete control of an attacker. Such security may be sufficient for casual attackers, but more sophisticated attackers are equipped with extensive computing resources and skills. They can perform attacks using simulated and instrumented environments and can completely or partially replicate the state of program execution to another machine.

Finally, the placement of the integrity check values introduces the third limitation. The authors acknowledged that unrestricted placement has the potential to produce prohibitively large log files. However, restricting the placement to points which are guaranteed to be executed on every execution of the program is also prohibitive for two reasons. First, the set of such points may be rather small, and second, for general programs identification of a deterministic path through a program is NP hard.

Branch-Based Tamper Resistance

The '934 Branch-Based invention, incorporated by reference above and described in [10], details a scheme wherein the software itself detects the tampering and causes the program to fail, thus protecting itself from malicious attacks without requiring a clearinghouse and related network connection. In this offline tamper resistance scheme, the same key evolving mechanism is used, but instead of merely recording the values, they are used to regulate proper program execution. The Branch-Based invention incorporates tamper detection capabilities into a protected copy of a software application by disassembling a statically linked binary of the application, modifying some of the instructions in the application, and then rewriting all of the modified and unmodified instructions to a new executable file, a protected copy. At least some of the branch instructions in the application are converted to call or control transfer instructions. The '934 invention determines a target displacement (stored in a displacement table) for each of the branch instructions replaced by a call instruction.

A call instruction is used to call a branch function, which could be an integrity check branch function or a fingerprint branch function depending on the situation. Within the branch function, tampering is detected through the computation of the return address; if the program has been altered the integrity check will yield an incorrect value, which will lead to the wrong slot in the displacement table being accessed. If the branch function is an integrity check branch function, alteration of the call location will yield an incorrect slot in the displacement table. If the branch function is a fingerprint branch function and if the current key has been altered, an incorrect slot in the displacement table will similarly be accessed. In each case, the wrong displacement will be added to the return address. Upon function return, an incorrect instruction executes, eventually leading to program failure.

The Branch-Based system also allows watermarking, comprising both an author mark and a fingerprint mark in the protected copy. A watermarking module evolves and stores a fingerprint key. The order of the target displacements within the displacement table is customized to a particular generation of the fingerprint key; consequently, the application only executes with the specific user key. The '934 system thus emulates the performance of a dongle without the drawback of dongle distribution. Furthermore, a fingerprint key does not have to be stored in the application; rather, a fingerprint key can be distributed with the program and be required when the program is executed. For example, during an online registration process, the system ties a fingerprint mark in the application with the purchaser by embedding some software in the program that enables the fingerprint capability functionality of the application.

The watermarking module comprises a conversion of branch instructions to a call instruction that calls a specifically constructed fingerprint branch function. This call function not only computes the fingerprint of the program but it also regulates execution of the program. Consequently, if an attacker attempts to remove the watermark embedded in an application by the '934 system, the resulting software is non-functional. The '934 system utilizes an embedding technique for the watermark in which a section of code is added to the application. This code calculates the fingerprint mark as the program executes and contributes to the proper execution of the program.

The Branch-Based algorithm is built on the use of a branch function similar to the one proposed by Linn and Debray to disrupt static disassembly of native executables [13]. The original branch function was designed simply to transfer execution control to the intended target instruction by replacing unconditional branch instructions with call instructions. Prior art FIG. 4 illustrates the general idea of the branch function. Such a transformation eliminates some of the obvious control flow making static analysis more difficult and provides minimal tamper resistance.

In order to provide tamper resistance for the entire application, Jin et al. enhanced the branch function to incorporate an integrity check and key evolution into the target instruction computation. The so called integrity check branch function (ICBF) performs the following tasks.

1. An integrity check producing the value $v_i$.
2. Computation of the new key $k_{i+1}$ using $v_i$ and the current key $k_i$, $k_{i+1}=f(k_i, v_i)$.
3. Identification of the displacement to the target via $d_{i+1}=T[h(k_{i+1})]$ where T is a table containing displacement values and h is a perfect hash function.
4. Computation of the intended target (the return location) by adding the displacement $d_{i+1}$ to the return address on the stack.

Tampering is dynamically detected as the program executes through the computation of $k_i$. When the program is altered, at least one integrity check will produce an unexpected value. This will lead to incorrect key evolution and calculation of the wrong target instruction. Execution of an improper instruction will ultimately lead to program failure, which is a desired outcome for tamper resistant software.

Through the enhancements and the use of multiple ICBFs, tamper resistance can be established for the entire program. For example, the check system can be configured such that one integrity check verifies that another has not been modified or removed.

There are three identified limitations to the Branch-Based technique. The first also occurs in the Event Log-Based algorithm and is associated with a design assumption. Jin, et al. assume that an attacker's analysis tools and program modifications will be detected by an integrity check. Furthermore, such detection is assumed to cause the program to terminate prior to the attacker gaining knowledge that will aid in the circumvention of the ICBFs. Once again, on a client machine that is under complete control of the attacker, achieving such a level of forward security is extremely difficult.

The second limitation relates to the need of an initial key $k_0$. Because the key evolution is linked to proper program behavior, the same initial key is required each time the program starts. To preserve the property of forward security provided by the one-way function, special care must be taken to prevent the discovery of the initial key. If the initial key goes unprotected, the attacker will be able to eventually discover it. Once discovered, it can be used to generate future keys and therefore unravel the protection mechanism. Jin, et al. suggest the use of secure computing devices such as the Trusted Platform Module (TPM) as a solution to this issue.

Despite this suggestion, repeated use of the same initial key is a major weakness and provides a point of attack not present in the Event Log-Based scheme.

The third limitation is analogous to the integrity check placement limitation present in the Event Log-Based technique. In the Event Log-Based algorithm the size of the log is minimized by restricting the placement of the integrity checks to points guaranteed to be encountered on every execution of the program. A similar restriction is also required in the Branch-Based algorithm. Because the key evolution is linked to proper program behavior, the key evolution must be regular. This limits the set of branch instructions eligible for conversion to those which reside on a deterministic path. However, the restriction is not as severe as in the Event Log-Based technique. Any branch which resides on a deterministic path through a chosen function is a candidate for replacement, as opposed to a deterministic path through the entire program.

The present invention builds upon the Event-Log Based invention and the Branch-Based invention to provide software tamper-resistance without a clearinghouse, and without constraints on key evolution points. The Branch-Based system is therefore now described in detail.

FIG. 5 portrays an exemplary overall environment in which the '934 system, method, and service for detecting improper manipulation of an application may be used. The system comprises a software programming code or a computer program product that is typically embedded within, or installed on a host server. Alternatively, the system can be saved on a suitable storage medium such as a diskette, a CD, a hard drive, or similar devices. A client owns an application. While described in terms of other application, the system can be applied to any executable programming code. The client wishes to acquire piracy and tamper protection for the application through a transformation process executed by the system. The client contracts to utilize the system on the application by means of a purchase or a service through a network. Purchase allows the client to purchase the system for operation on a client's server. In this case, the server is owned or otherwise operated by the client. Alternatively, the client can acquire protection for the application through subscribing to a service. In this case, the server is owned or otherwise operated by the owner of the system or an agent of the owner of the system.

The '934 system analyzes and transforms the software application, producing a protected copy. The server transfers the protected copy to a client distribution via a network for distribution of the protected copy to users. The server further transfers the protected copy to a distribution center. The distribution center comprises, for example, a store in which a user may purchase a pre-packaged version of the protected copy. The client distribution comprises, for example, a web site operated by the client at which a user may purchase and download the protected copy.

FIG. 6 illustrates a high-level hierarchy of the system, including an integrity check processor and a watermarking processor. The protected copy comprises branch function(s), an integrity check module, a watermarking module, and a displacement table T.

The integrity check module comprises integrity check branch function(s). The integrity check processor transforms one or more branch instructions in application to calls to integrity check branch functions in the protected copy. Each of the integrity check branch functions access a cell or "slot" in table to locate a target instruction of the branch instruction. Consequently, control flow is obfuscated by routing control flow through the integrity check module.

The watermarking module comprises fingerprint branch function(s). The watermarking processor embeds a watermark by disassembling a statically linked binary of application, modifying the instructions of application to generate the fingerprint branch functions, and then rewriting the instructions to a new executable file, the protected copy. The watermarking module further comprises a fingerprint mark, one or more fingerprint keys, and an authorship mark.

The branch function is a special function used as part of an obfuscation technique to disrupt static disassembly. This obfuscation technique converts unconditional branch instructions to a call to the branch function that is inserted in the protected copy. The purpose of the branch function is to transfer the control of execution to the instruction that was the target of the unconditional branch instruction (further referenced herein as the target instruction). The branch function can be designed to handle any number of unconditional or conditional branches.

In general, the branch function is responsible for choosing the correct target instruction based on the call location. There are a variety of ways to accomplish such a task. FIG. 7 illustrates a method in generating the branch functions and the table. The system executes application. During execution of the application, the system selects one or more branch instructions in application and constructs a mapping between locations of the branch instructions ($j_n$) and the target instructions ($t_n$) of the selected branch instructions:

$$\text{Theta}=\{j_1 \rightarrow t_1, j_2 \rightarrow t_2, \ldots, j_n \rightarrow t_n\}$$

The system uses a hash function to assign a unique identifier to locations of each of the selected branch instructions: $h=\{j_1, j_2, \ldots, j_n\} \rightarrow \{1, 2, \ldots, n\}$ The system constructs a displacement table T in a data section of the protected copy that lists displacements for each $(j_i, t_i)$ pair; the displacement is the difference in location in the code of application from a selected branch instruction to the target instruction of the selected branch instruction. The displacements are stored in the displacement table T such that $T[h(j_i)]=t_i-j_i$. The system writes the branch functions with the executable code of application to the protected copy.

The use of the branch function provides tamper detection. Any transformation applied to a branch function that alters the displacement between the branch instruction and the target instruction causes the branch function to return to an incorrect target instruction. Through the use of the branch function, obvious control flow is removed from the protected copy.

FIG. 8 (FIGS. 8A, 8B) illustrates a method of operation of the protected copy. A user executes the protected copy. The protected copy selects an instruction to execute. If the selected instruction is not a call to a branch function, the protected copy executes the instruction. While the method is illustrated using a call instruction, any branch instruction may be used that transfers execution control to one of the branch functions. If no additional instructions remain in the protected copy for execution, the protected copy exits execution. If additional instructions remain, the protected copy selects a next instruction and returns.

If the selected instruction is a call to a branch function, the protected copy calls the branch function. An integrity check is performed to generate a value $v_i$. A value $x_i$ is produced using $v_i$ and either the previous key, $k_{i-1}$, or the branch location $b_i$. The called branch function applies a hash function to the value generated $x_i$ to compute $h(x_i)$. The term $h(x_i)$ corresponds to a slot in the displacement table T. The branch function accesses the slot $h(x_i)$ in the displacement table T and obtains the displacement to a target instruction. The branch function adds the displacement to the return address of the call instruction (corresponding to the original branch instruction replaced by the call instruction).

The protected copy goes to the target instruction and executes the instruction. If no additional instructions remain in the protected copy for execution, the protected copy exits execution. If additional instructions remain, the protected copy selects a next instruction and returns.

FIG. 9 illustrates conversion of a branch instruction to the branch function using, as an example, an exemplary application in the x86 instruction set. In this example, instructions such as, for example, jmp, call, and jcc instructions, are converted to call instructions. Each of the call instructions calls a single branch function. The branch function directs control flow to target locations. FIG. 9 demonstrates how a control flow is interpreted in an application after transformation by the system. For example, an instruction in the exemplary application before transformation is:

j1:jump t1

The system replaces instruction 525 with call instruction 530:

j1:call b where the instruction "call b" references a call to the branch function. The branch function returns execution control to the target instruction at target location t1.

To provide further tamper detection for the protected copy, the integrity check processor transforms one or more branch instructions into branch functions that incorporate an integrity check, referenced herein as integrity check branch functions. One or more integrity check branch functions are incorporated in the protected copy to develop a self-monitoring check system for the protected copy.

The integrity check processor inserts the integrity check module in the protected copy. The integrity check module incorporates an integrity check into the computation of the location of a target instruction. FIG. 10 illustrates a method of operation of the integrity check module. The integrity check module performs an integrity check that produces a value $v_i$. The integrity check module computes a value $a_i$ using $v_i$ and a branch instruction location $b_i$, $a_i = g(b_i, v_i)$. The integrity check module identifies a displacement to a target instruction from a selected branch instruction via $d_i = T[h(a_i)]$ where the displacement table T is stored in the data section of the protected copy and h is a hash function. The integrity check module computes a return location of the target instruction by adding the displacement $d_i$ to the return address of the selected call instruction.

Through the incorporation of an integrity check in the integrity check branch function, the system provides tamper detection for the entire program of the protected copy as opposed to only those instructions between a branch instruction and a target instruction. The integrity check module is an inserted section of code used to verify the integrity of the protected copy. Any of a variety of techniques can be used by system to perform an integrity check such as, for example, a checksum over a block of code. Through the use of integrity checks, the protected copy can identify, for example, whether it has been subjected to semantics-preserving transformations or whether a debugger is present during execution.

FIG. 11 (FIGS. 11A, 11B) illustrates a method in which a tamper detection mechanism is incorporated into the protected copy by injecting an integrity check module into the protected copy and converting selected branch instructions to calls to the integrity check branch functions. The system executes application. The integrity check processor selects a set of branch instructions, $\{b_1, \ldots, b_n\}$, for conversion into call instructions.

The number and location of the selected branch instructions is based on a trade off between robustness and performance overhead. The robustness against reverse engineering is partially based on the number of converted branch instructions. However, as the number of converted branch instructions increases so does the overhead of repeated execution of the integrity check branch functions. A criterion used for selecting branch instructions in performance sensitive application is to avoid program hotspots (sections of code that are repeatedly executed). Otherwise, branch instructions can be selected in a random fashion. The system can select any, some, or all of the branch instructions for transformation to call functions that call the integrity check branch functions.

The integrity check processor constructs a mapping between the selected branch instructions and the integrity check branch functions:

$$\text{Theta} = \{b_1, \ldots, b_n\} \rightarrow \{\text{IntegrityCheck}_1, \ldots, \text{IntegrityCheck}_n\}$$

where the term IntegrityCheck refers to an integrity check branch function. The integrity check processor uses this mapping to replace the selected branch instructions by calls to the appropriate integrity check branch functions.

The integrity check processor constructs a displacement table T. For each of the selected branch instructions replaced in application, a mapping is maintained between the calculated value $a_i$ and the displacement $d_i$ between the selected branch instruction and its related target instruction displacement. This mapping is described as:

$$\text{Phi} = \{a_1 \rightarrow d_1, \ldots, a_n \rightarrow d_n\}$$

The integrity check processor uses Phi to construct the displacement table T. To fill the displacement table T the integrity check processor constructs a hash function, h, such that each value $a_i$ maps to a unique slot in the displacement table T:

$$H: \{a_1, \ldots, a_n\} \rightarrow \{1, \ldots, m\}, n \leq m$$

where $\{1, \ldots, m\}$ are the slots in the displacement table T to which the values $\{a_1, \ldots, a_n\}$ are mapped. By using a perfect hash function, the size of the displacement table T can be minimized. Based on h, the displacement table T is added to the data section of the protected copy:

$$T[h(a_i)] = d_i$$

The system writes the integrity check module, the integrity check branch functions, and remaining executable code from application to the protected copy.

FIG. 12 illustrates an exemplary code transformation from original code to protected code incorporating the integrity check module. Branch instruction jmp L2 is transformed to call_branch_function_1 820. Branch instruction jge L3 is transformed to call_branch_function_2 830. Branch instruction call printf is transformed to call_branch_function_3 840. Branch instruction jmp L1 is transformed to call_branch_function_1 850.

FIG. 13 illustrates an exemplary control flow graph representing the original code and a protected control flow graph representing protected code. The original control flow graph and the protected control flow graph demonstrate how control flow is interpreted before and after the transformation of application to the protected copy by the integrity check processor.

In one embodiment, the system further enhances the tamper-detection strength of protected copy through the use of indirection. Added levels of indirection increase the amount of analysis required by an attacker to understand the protected copy. Further indirection can be incorporated by rerouting all calls to the integrity check branch functions through a single super branch function that transfers execution to the proper branch function.

A goal of any tamper detection technique is to prevent an adversary from altering or reverse engineering the program. One of the most common forms of automated attack is code obfuscation. Through the use of the integrity check modules, the protected copy is able to self-detect semantics-preserving transformations. A variety of transformations were applied to an exemplary protected copy to verify that protected copy behaved as expected. In each case, the protected copy failed to function correctly after the obfuscation had been applied, as desired.

A common manual attack is to inspect the code of an application to locate and remove a license check. Successful removal of the license check in the protected copy requires an attacker to "unravel" the displacement table T and replace all of the calls with the correct branch instruction and displacement; otherwise the alteration is detected by the protected copy. This attack requires extensive dynamic analysis that in many cases is prevented by the integrity check modules installed in the protected copy by the system. For example, the use of a debugger can be self-detected by the protected copy, leading to incorrect program behavior or failure, as desired.

The system further inhibits the ability of an adversary to reverse engineer the protected copy. By replacing conditional and unconditional jumps, the obvious control flow of the protected copy has been removed. Advantageously, the protected copy detects an attack based on information available only at runtime, eliminating the use of static analysis tools. To completely reverse engineer the program, an attacker has to dynamically analyze the protected copy. The integrity check module installed in the protected copy by system significantly inhibits dynamic analysis.

The system improves the level of protection of the protected copy by intertwining tamper detection with software watermarking such as author marking and fingerprinting performed by the watermarking module. The system provides another protection mechanism for the protected copy and protects the watermark from being damaged or removed.

Fingerprinting can be accomplished through the use of a key generating branch function, the fingerprint branch function. The watermark processor embeds the fingerprint mark in the protected copy by selecting a specific set of functions that call the fingerprint branch function. The fingerprint mark is a composition of one or more final keys produced for each of the selected functions.

Each time the fingerprint branch function executes in the protected copy, the fingerprint key is evolved in a key generation cycle. The generation of the fingerprint key is based on a one-way function that takes as input the integrity check value and a previous fingerprint key, $k_{i-1}$:

$$k_i = g(k_{i-1}, v_i).$$

The newly generated fingerprint key $k_i$ is used in the displacement look-up. The displacement is found in slot $h(k_i)$ in the displacement table T.

The displacement is mapped to a specific fingerprint key in the key generation cycle. Consequently, the system uses a subset of the branch instructions in application that are on a deterministic path; i.e. the branch instructions are executed each time the protected copy executes. If a branch instruction is not executed each time the protected copy executes, the fingerprint key does not evolve correctly. Therefore, the branch instructions used for computation of the fingerprint key in the watermarking module are required to reside on a deterministic path through the protected copy.

FIG. 14 is an exemplary control flow graph of a function illustrating deterministic and non-deterministic branch instructions. The control flow to block 1010 and block 1015 from block 1005 represents a "conditional" branch instruction where either block 1010 or block 1015 is executed. A branch instruction 1030 in block 1005 and a call instruction 1035 in block 1020 are deterministic branch instructions and can be used by the watermarking processor for fingerprinting the protected copy. However, the watermarking processor cannot use a branch instruction jmp 1040 in block 1010; the branch instruction jmp 1040 is part of the else branch instruction and is not guaranteed execution every time the function 1000 is executed. Furthermore, branch instructions selected for use by the watermarking processor cannot be part of a non-deterministic loop because a new fingerprint key is generated in the protected copy each time one of the fingerprint branch functions is executed.

A set of deterministic branch instructions useable by the system to generate a fingerprint is identified through dataflow analysis of the application. Each of the selected deterministic branch instructions is replaced with a call to one of the fingerprint branch functions. When the protected copy comprises both an integrity check module and a watermarking module, the system uses for the integrity check modules those non-deterministic branch instructions not used to generate the fingerprint key for the watermarking module.

The watermarking processor comprises an embed function and a recognize function. The embed function for the system can be described with the following inputs and outputs:

Embed(P,AM,keyAM,keyFM)→P',FM, where P is an input program, application, AM is the authorship mark, keyAM is the secret authorship key for the authorship mark, FM is the fingerprint mark, keyFM is a secret fingerprint key for the fingerprint mark, and P' is an output program, the protected copy.

The system concurrently embeds the authorship mark and the fingerprint mark. Consequently, two secret keys are required: the authorship key keyAM, and the fingerprint key keyFM. In contrast, a conventional fingerprinting system uses a single key. The authorship key keyAM, is tied to the authorship mark and is the same for every copy of the protected copy. The fingerprint key keyFM is required for the fingerprint mark and is unique for each copy of the protected copy. An initial key value for the fingerprint key keyFM is optionally assigned to the protected copy as part of the process of registering the protected copy. The fingerprint mark for a particular instance of the protected copy is based on the fingerprint key keyFM, and execution of the protected copy. The fingerprint mark, is generated during embedding and is an output of the embed function.

The recognize function for watermarking processor can be described with the following inputs and outputs:

recognize(P',keyAM,keyFM)→AM,FM

The recognition technique of the watermarking processor is blind; i.e., the authorship mark and the fingerprint mark are obtained from the protected copy by providing the secret keys: the authorship key keyAM, and the fingerprint key keyFM.

The watermarking module of the system is dynamic; i.e., the authorship key keyAM, is an input to the protected copy. By executing the protected copy with the secret input of the authorship key keyAM, a trace comprising of a set of deterministic branch instructions is identified. The set of deterministic branch instructions comprises those functions that participate in a calculation of the fingerprint mark. The authorship key keyAM, serves to provide a stronger argument for the validity of both the authorship mark and the fingerprint mark. Further, the authorship key keyAM makes recognition more reliable. When the protected copy is executed with the authorship key keyAM, (i.e., the secret input), the owner of the application knows that the fingerprint mark is produced and knows where to locate the fingerprint mark.

The watermarking module generates the fingerprint mark as the protected copy executes through the use of the fingerprint branch function and the fingerprint key keyFM. The original branch instruction in the application simply transferred execution control to the branch instruction target. In addition to the transfer of execution control, the fingerprint branch function is responsible for evolving the fingerprint key keyFM.

FIG. 15 illustrates a method of the fingerprint branch function in evolving the fingerprint key keyFM. Each time the fingerprint branch function is called, a new fingerprint key $k_i$, is produced and the return location of the target instruction is identified with the aid of the fingerprint key $k_i$. The fingerprint branch function performs an integrity check that produces a value, $v_i$. The fingerprint branch function evolves the next fingerprint key, $k_i$, through the use of a one-way function, $k_i=g(k_{i-1}, v_i)$. The fingerprint branch function identifies a slot, $s_i$, in the displacement table, T where the displacement to the target instruction is located $s_i=h(k_i)$.

The fingerprint branch function identifies a displacement to the next instruction via $d_i=T[s_i]$, where the displacement table, T is stored in the data section of the protected copy and h is a perfect hashing function. The fingerprint branch function computes the return location of the target instruction by adding the displacement, $d_i$, to the return address of the call instruction that called the fingerprint branch function. Execution control is returned to the target instruction at the computed return location.

A variation in the fingerprint mark is obtained through the fingerprint key, keyFM, that is unique for each copy of the protected copy. The system uses an initial key in the generation of the fingerprint key, keyFM. The system obtains each function in the set of functions comprising a deterministic branch instruction by executing the protected copy with the secret input, producing a function key. Each of these function keys is combined in a commutative way (e.g., by adding the values) to produce the fingerprint mark for the protected copy.

Within the fingerprint branch function, the authorship mark and tamper detection can be incorporated. An ideal authorship mark possesses some mathematical property that allows for a strong argument that it was intentionally placed in the program and that its discovery is not accidental. An example of such a mathematical property is AM=pq where p and q are very large primes. Factoring the authorship mark into p and q is a difficult problem; only the person who embedded such a watermark is able to identify the factors p and q. To encode the authorship mark in the fingerprint branch function, the system uses a one-way function such that one of the variables in the authorship mark. An exemplary one-way function is:

$$k_i=SHA1[(k_{i-1} \text{ XOR AM})\|v_i]$$

As used herein, the term SHA1 refers to a specific cryptographic hash function that can be used in conjunction with the '934 invention.

The system provides tamper detection with the branch function. The displacement table, T stores a displacement, therefore any transformation applied to the branch function that alters the displacement between a branch instruction and the target instruction of the branch instruction causes the branch function to return to an incorrect instruction. When utilizing the fingerprint branch function, the system incorporates an integrity check that provides tamper detection throughout the protected copy. An integrity check is a section of code inserted in the protected copy to verify the integrity of the protected copy. One such example of an integrity check is a checksum over a block of code.

The integrity check identifies whether the protected copy has been subjected to semantics-preserving transformations or whether a debugger is present during execution of the protected copy. The integrity check produces some value $v_i$ that is used as an additional input to the one-way function responsible for the generation of the fingerprint key. By basing the generation of the fingerprint key on $k_{i-1}$ and $v_i$, the system is able to cause failure of the protected copy if either the fingerprint key or the code of the protected copy has been altered.

The system embeds the fingerprint mark and the authorship mark by injecting the fingerprint branch function into the application. The system further embeds the fingerprint mark and the authorship mark by converting branch instructions to calls to the fingerprint branch function. FIG. 16 illustrates a method of the embedding process of the watermarking processor. The watermarking processor executes application using the secret input to obtain a trace of application.

The trace identifies a set of functions comprising deterministic branch instructions through which execution passes; the selected deterministic branch instructions reside on a path through a function that is traversed each time the function is executed. To identify the deterministic path through the function in the application, the watermarking processor computes a dominator set for the exit block in a function control flow graph. The dominator set may comprise blocks that are part of a non-deterministic loop, such as the loop header. Any such block is removed from the path.

The watermarking processor replaces each of the selected deterministic branch instructions with calls to the fingerprint branch function. For each branch instruction replaced by the watermarking processor, the watermarking module maintains a mapping between a calculated key and the displacement to the target instruction:

$$\text{Theta}=\{k_1 \rightarrow d_1, k_2 \rightarrow d_2, \ldots, k_n \rightarrow d_n\}$$

The watermarking processor uses Theta to construct the displacement table, T. The watermarking processor constructs the perfect hash function such that each fingerprint key maps to a unique slot in the displacement table, T and the size of the displacement table, T is minimized: $h=\{k_1, k_2, \ldots, k_m\} \rightarrow \{1, 2, \ldots, n\}$ The watermarking processor adds the displacement table, T to the data section of the protected copy: $T[h(k_i)]=d_i$ FIG. 17 illustrates a method of operation in recognizing an embedded authorship mark or an embedded fingerprint mark. The system executes the protected copy using the secret input. Executing the protected copy identifies a set of functions comprising deterministic branch instructions that have been fingerprinted. Executing the protected copy further identifies the fingerprint branch function(s). Once the fingerprint branch function has been identified, the system isolates the one-way function to extract the authorship mark. To extract the fingerprint mark, the system accesses the location where the evolved fingerprint key is stored for each of the functions comprising deterministic branch instructions. The evolved fingerprint key can be stored in the stack, in memory, etc. The system combines the evolved fingerprint keys to form the fingerprint mark.

The protected copy is successful in defending attacks such as, for example, an additive attack, a distortive attack, a collusive attack, or a subtractive attack. In an additive attack, an adversary embeds an additional watermark in the protected copy so as to cast doubt on the origin of the intellectual property. An attacker is successful even if the original mark remains intact; however, the attacker considers it more desirable to damage the original mark. The watermarking module is successful at thwarting an additive attack even if a different watermarking scheme is used to embed the second watermark.

The protected copy is successful at defending against the additive attack because of the use of the fingerprint branch function, the integrity check branch function, or the branch function. The displacement table, T stores a displacement to the next instruction, therefore any transformation applied to a function that alters the displacement between a branch instruction and its target instruction without updating the displacement table, T causes the fingerprint branch function, the integrity check branch function, or the branch function to return to an incorrect instruction. Consequently, any modification made to the protected copy by inserting additional watermark code that alters the displacements yields a non-functional program.

Furthermore, the protected copy is successful at defending against the additive attack because of the use of the integrity check module. The integrity check module monitors execution of the protected copy, thus detecting any modifications made by embedding an additional watermark in the protected copy.

In a distortive attack, an attacker applies a series of semantics-preserving transformations to the protected copy in an attempt to render a watermark such as the authorship mark or the fingerprint mark useless. The attacker wishes to distort the protected copy in such a way that the watermark becomes unrecoverable while the functionality and performance of the protected copy remain intact. As with the additive attack, a distortive attack cannot succeed in yielding a fully functional protected copy that no longer contains the watermark. Any change in the code of the protected copy either trips an integrity check or alters a displacement to a target instruction, causing the protected copy to produce incorrect results.

A collusive attack occurs when an adversary obtains more than one copy of the protected copy, each with a different fingerprint mark. The attacker compares the copies in an attempt to isolate the fingerprint mark. With conventional watermarking algorithms, prevention of a collusive attack is addressed through the use of code obfuscation. Code obfuscation applies different sets of obfuscations to the fingerprinted program, making the code different throughout the fingerprinted program rather than just at the fingerprint mark. While this is a viable option for thwarting a collusive attack, code obfuscation incurs a noticeable performance overhead and increases the size of the fingerprinted program.

The protected copy is highly resistant to the collusive attack without the use of obfuscation. The only difference between two differently fingerprinted copies of the protected copy is the order of the values in the displacement table, T. Consequently, an attacker has to carefully examine the data section of each of the differently fingerprinted copies of the protected copy to identify a difference.

Collusive attacks can be further thwarted through the use of the integrity check module. The integrity check module recognizes the use of a debugger and causes the program to fail in the case of an attack. In a dynamic attack, the only difference the adversary can detect is the value of the fingerprint key that is evolved to yield a different slot in the displacement table, T. If an adversary is able to launch a successful collusive attack, extensive manual analysis in the form of a subtractive attack is required to remove the fingerprint mark.

In a subtractive attack, an attacker attempts to completely remove a watermark such as the authorship mark or the fingerprint mark from the disassembled or decompiled code of the protected copy. If the attacker is able to identify which sections of code in the protected copy are generating the fingerprint mark, the attacker then has to manually analyze the protected copy to identify all of the call instructions that are converted branch instructions. The attacker then has to identify the correct target instruction and replace the call with the correct branch instruction and displacement.

If the attacker only converts those branch instructions responsible for generation of the fingerprint mark and does not also convert the other branch instructions, the protected copy fails to execute properly. The protected copy fails because the decoy branch functions are designed as a check and guard system. One of the duties of the check and guard system is to verify that the fingerprint branch function has not been altered or removed. Consequently, removal of the fingerprint branch function also requires removal of the decoy branch functions. The manual analysis required to accomplish such a task is extensive.

The '936 invention is described in relation to an application, but is applicable as well to, for example, any executable software code, such as Java bytecode. More specifically, each programming language places different restrictions on the capabilities of the language, the structure of the produced code, and the functionality. An alternative embodiment of the protection mechanism relies on the use of an interface and explicitly thrown exceptions. The main difference between the previously described protection mechanism and this alternative embodiment is in the manner in which the fingerprint branch function transfers execution control. Previously, the table stored displacements. In the Java version the table stores objects. The Java fingerprint branch function looks up an object in an array and then calls that method's branch function. The purpose of the function branch is to throw a unique exception. Once the exception is thrown, it will be propagated up to the method that invoked the fingerprint branch function. When this occurs, the invoking method will find the exception in its exception table and transfer control to the instruction specified. This instruction is the target of the converted branch.

The Java fingerprint branch function performs the following:

An integrity check producing a value $v_i$.
Generation of the next method key, $k_i$, through the use of a one-way function, $k_i = g(k_{i-1}, v_i)$.
Object look up through the use of a table, the key, and a hash function, A $a = T[h(k_i)]$.
Call the method branch using the object a, a.branch( ).

The main idea of the fingerprint branch function is similar to what has been described earlier. The function still performs an integrity check, evolves a key, and eventually transfers execution back to the calling function, but the means for accomplishing this are different.

In order to perform the fingerprint calculation, an interface, A, is added to the program. A must specify at least one branch method. Additionally, n classes $A_1, A_2, \ldots, A_n$ are added to the program which each implement the interface A. The branch method in each of the $A_i$ classes will throw a unique exception. A table of objects which are subclasses of A is also inserted, so a combination of objects $A_1, \ldots, A_n$ exists. This table is inserted in the form of an array T. The order of the objects in T is determined in the same manner as the displacement table in the previously described protection mechanism. A key aspect of this fingerprint branch function is the use of the interface. Because the object is being instantiated as type A, which is an interface, the method lookup for branch will be dynamic and occur at runtime.

In the previous protection mechanism all conditional and unconditional branch instructions are replaced. In this alternative embodiment, only the goto and conditional branches are replaced, and the method call instructions are not replaced or the instructions in Java invoked, because the target listed in the exception table must be an instruction within the method. Only those branches on the deterministic path can be used to call the fingerprint branch function. This restriction is necessary for the same reason as with the previously described protection mechanism.

Another important aspect of the Java Branch-Based watermark is that for each converted branch, n entries must be added to the exception table. One of the entries is the correct target, and n−1 are decoys. If the decoy exception entries are omitted then the branch, target pairs become obvious. During the Java verification process exception edges are considered a possible path when checking for consistent stack height, that local variables have been initialized, etc. Thus, the targets of the decoy exceptions must be chosen such that the bytecode will still pass the Java verifier.

While the '934 Branch-Based invention avoids the '130 Event-Log Based invention's need for a clearinghouse and thus enables offline tamper-resistance, as a practical matter the '130 and '934 inventions are both constrained to allow key evolution to occur only along the common execution path. An invention that provides software tamper-resistance without a clearinghouse, and without such a constraint on key evolution points is therefore needed.

SUMMARY OF THE INVENTION

It is an object of this invention to provide a method, system, and program product for preventing a malicious user from analyzing and modifying software content.

Two previously proposed tamper resistance techniques, Event Log-Based and Branch-Based, are both based on a common key evolution mechanism. Because of this, they both suffer from a common limitation associated with the placement of either the integrity checks or the call to the branch function. Restricting these placements to points along a deterministic path can limit the usefulness and weaken the overall strength of the tamper resistance capabilities.

It is a related object of the invention to address this issue via the use of a more specific category of one-way function. The outputs of these one-way functions are key values which are members of a chosen subgroup. The key evolution will stay within the subgroup unless tampering occurs, in which case the new key will stray from the subgroup. It is very unlikely that continued key evolution will yield a value back in the subgroup.

The invention also solves the initial key weakness in the Branch-Based scheme of [10] by using the subgroup extension. Now, like the Branch-Based technique, any key in the subgroup can be used to start the program. This eliminates the need for any special protection on the initial key.

As with the original techniques, some performance and size impact was to be expected. However, evaluation shows that through careful implementation the impact incurred can be tolerable. Overall, the subgroup extension improves the strength of both the Event Log-Based and the Branch-Based tamper resistance techniques without significantly impacting the size or performance of the applications.

The foregoing objects are believed to be satisfied by the embodiments of the present invention as described below.

BRIEF DESCRIPTION OF THE DRAWINGS

FIG. 12 is a prior art programming code listing illustrating an exemplary code transformation by the piracy protection system of FIGS. 5 and 6 from an original code to a protected code.

DETAILED DESCRIPTION OF THE INVENTION

Figure 1:
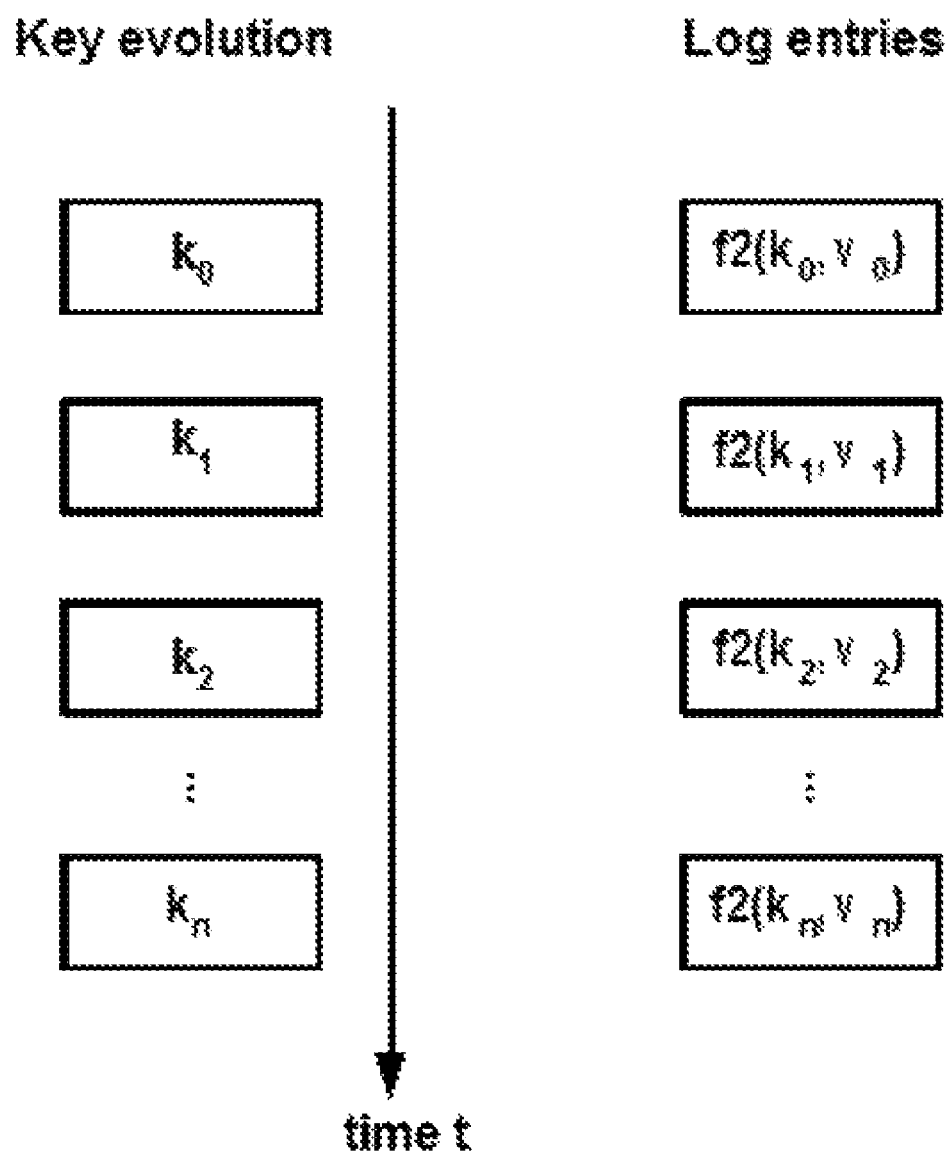
FIG. 1 is a prior art diagram of a method wherein key progression is independent of log entry value.
Figure 2:
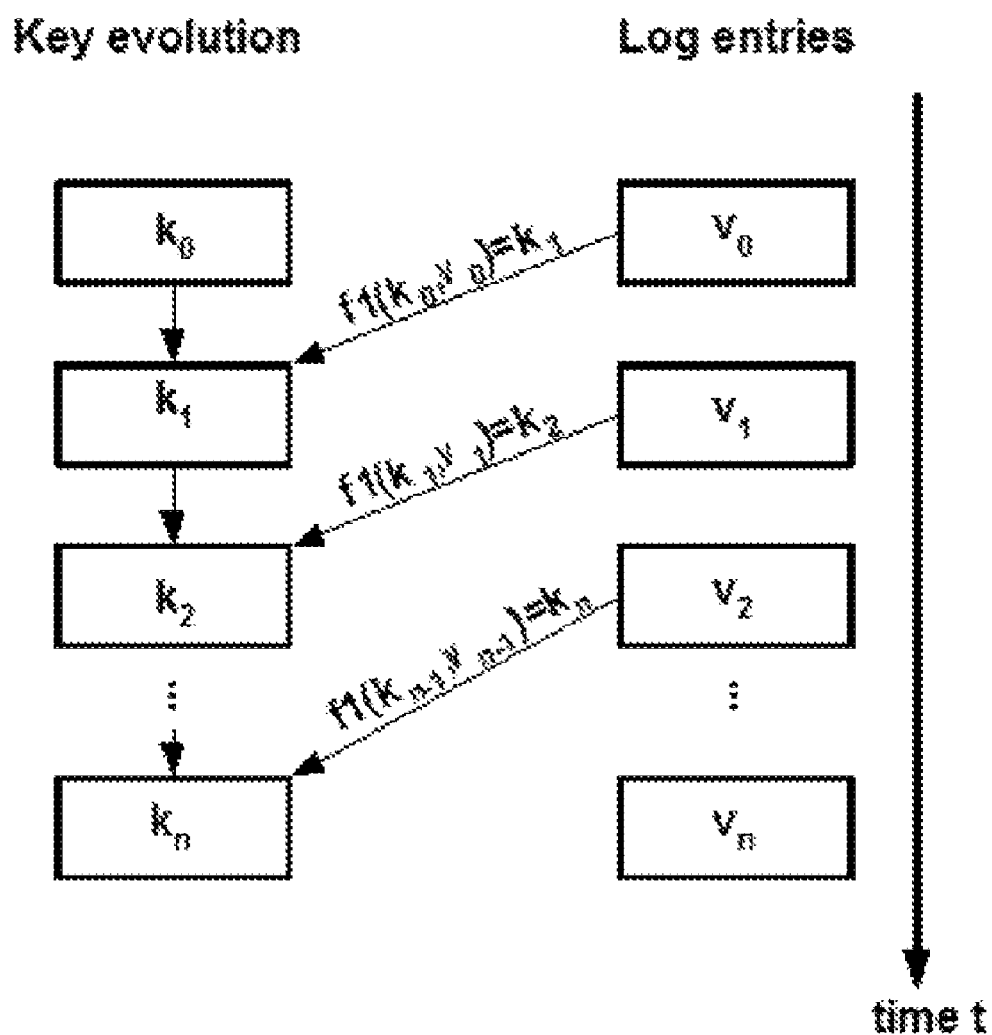
FIG. 2 is a prior art diagram wherein the key progression uses the log entry value.
Figure 3:
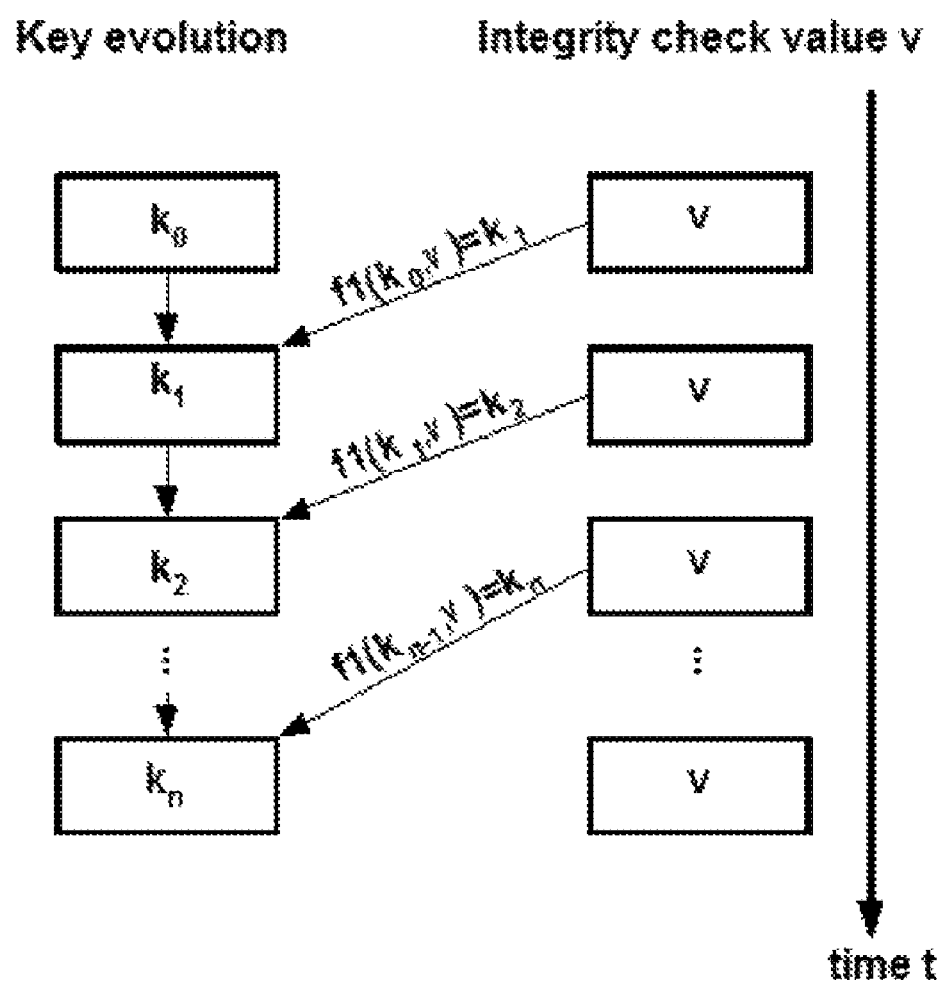
FIG. 3 is a prior art diagram of a single key embodiment of the '130 invention.
Figure 4:
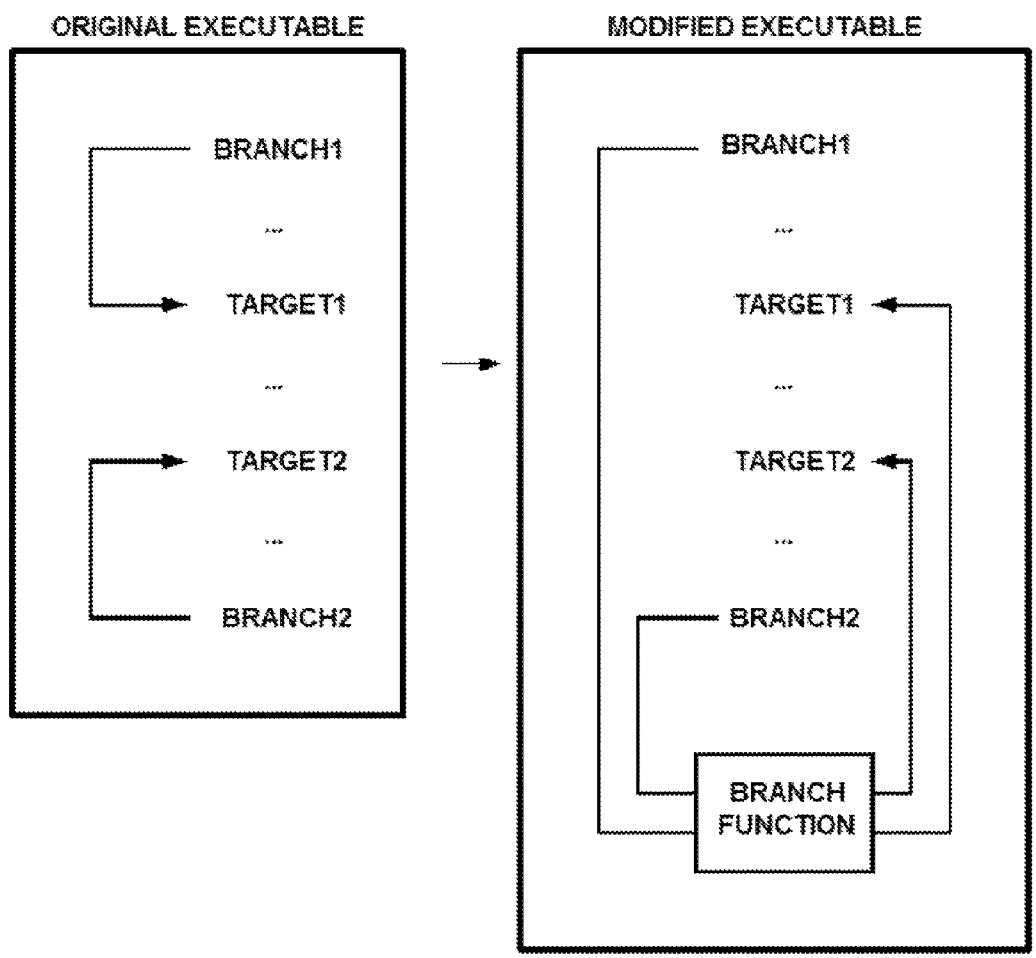
FIG. 4 is a prior art diagram of a branch function.
Figure 5:
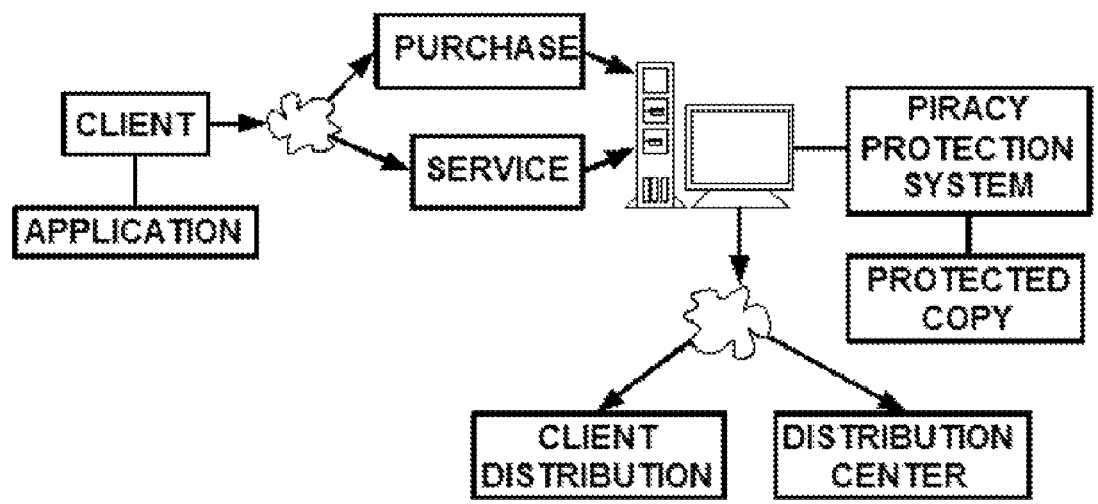
FIG. 5 is a prior art schematic illustration of an exemplary operating environment in which a piracy protection system of the present invention can be used.
Figure 6:
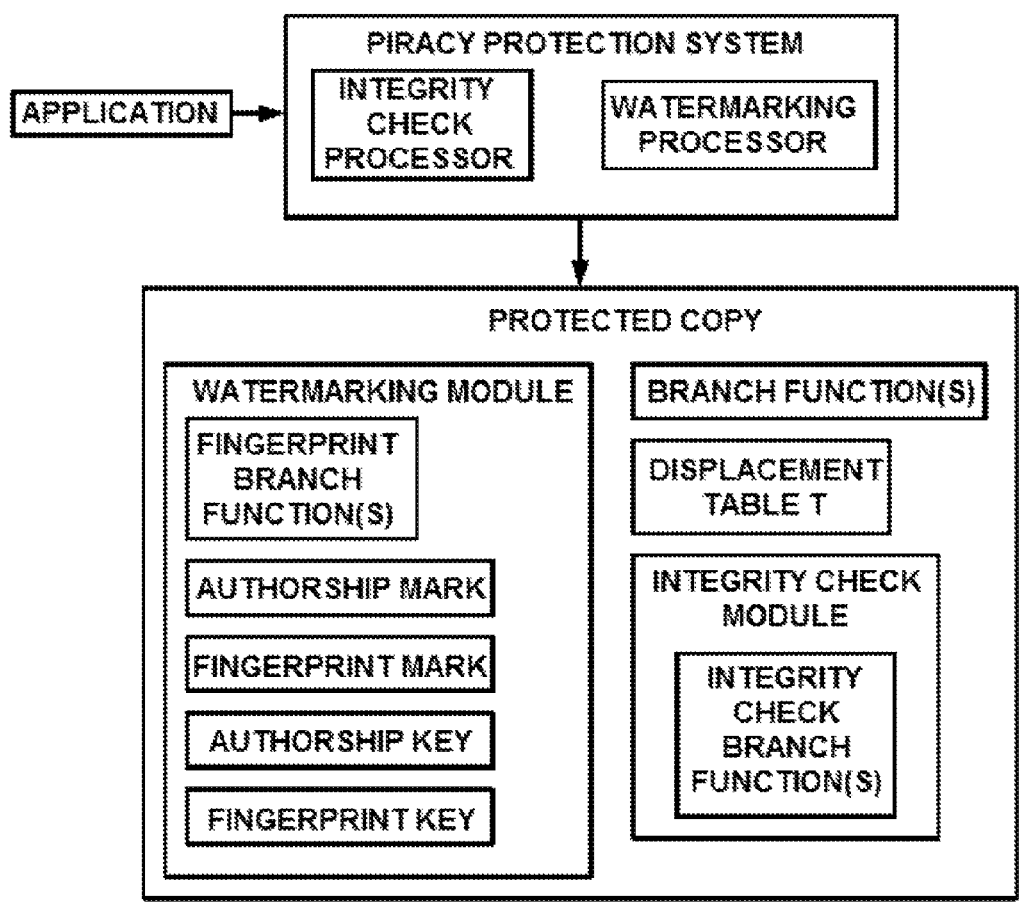
FIG. 6 is a prior art block diagram of the high-level architecture of the piracy protection system of FIG. 5.
Figure 7:
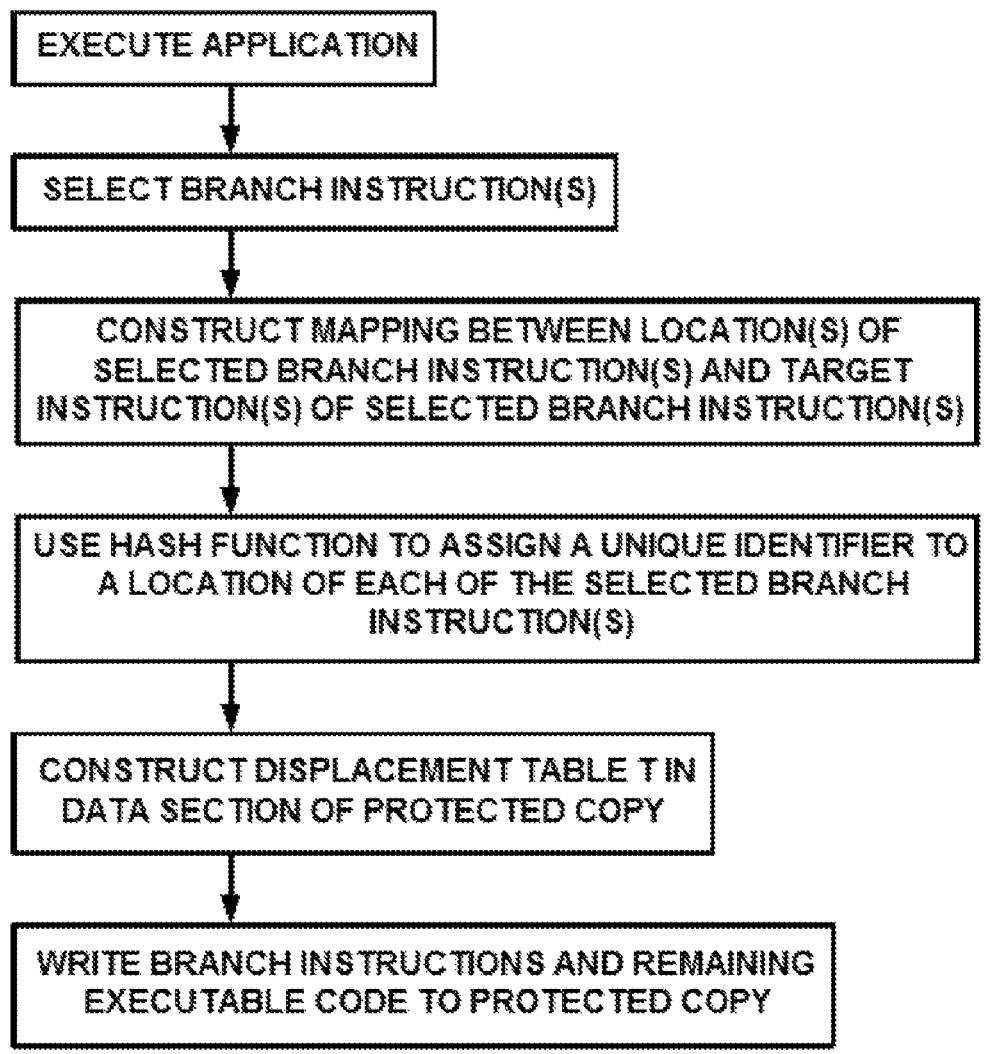
FIG. 7 is a prior art process flow chart illustrating a method of operation of the piracy protection system of FIGS. 5 and 6 in generating a protected copy of an application.
Figure 8A:
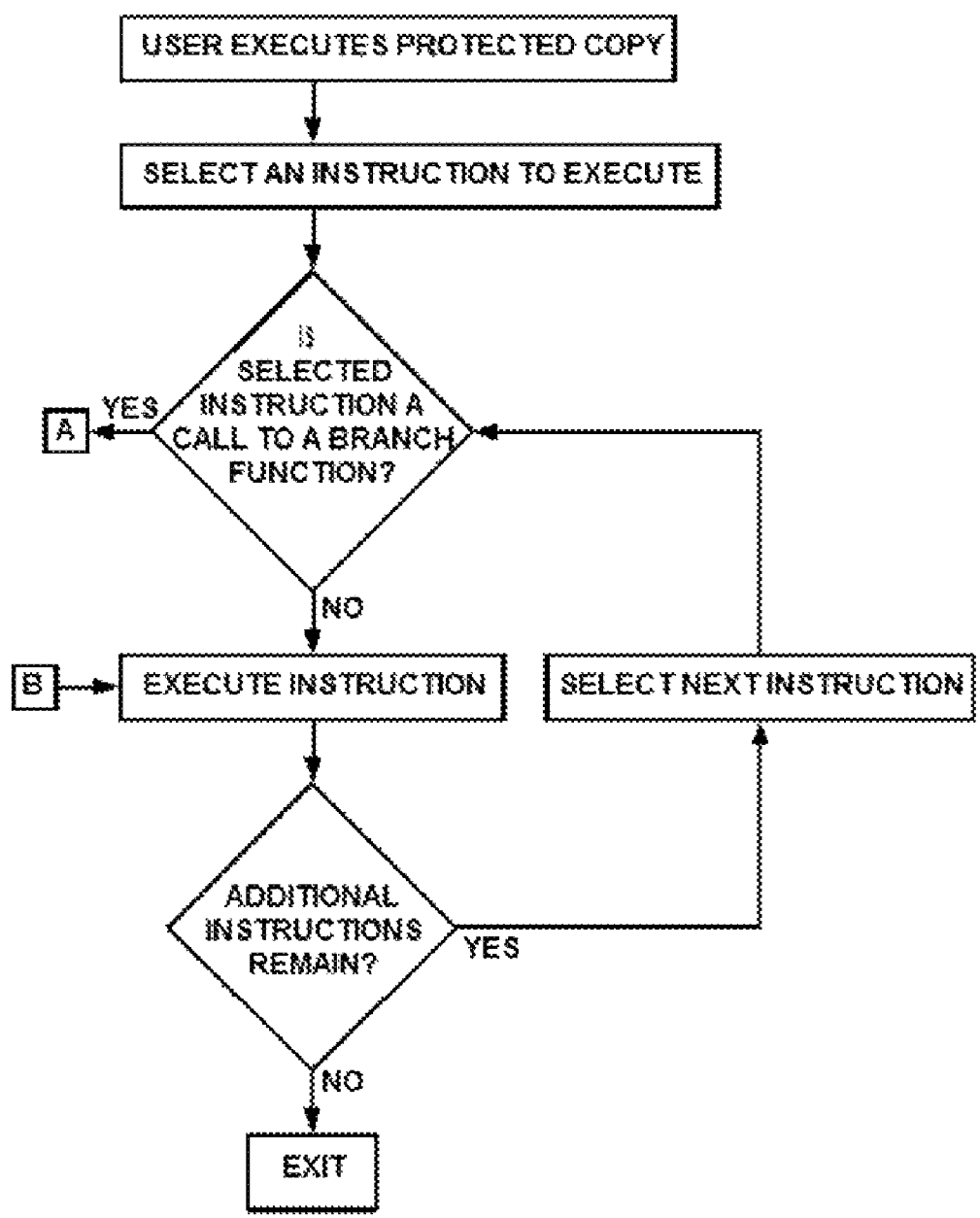
FIG. 8 is comprised of FIGS. 8A and 8B, and represents a prior art process flow chart illustrating a method of operation of the protected copy comprising branch instructions generated by the piracy protection system of FIGS. 5 and 6.
Figure 8B:
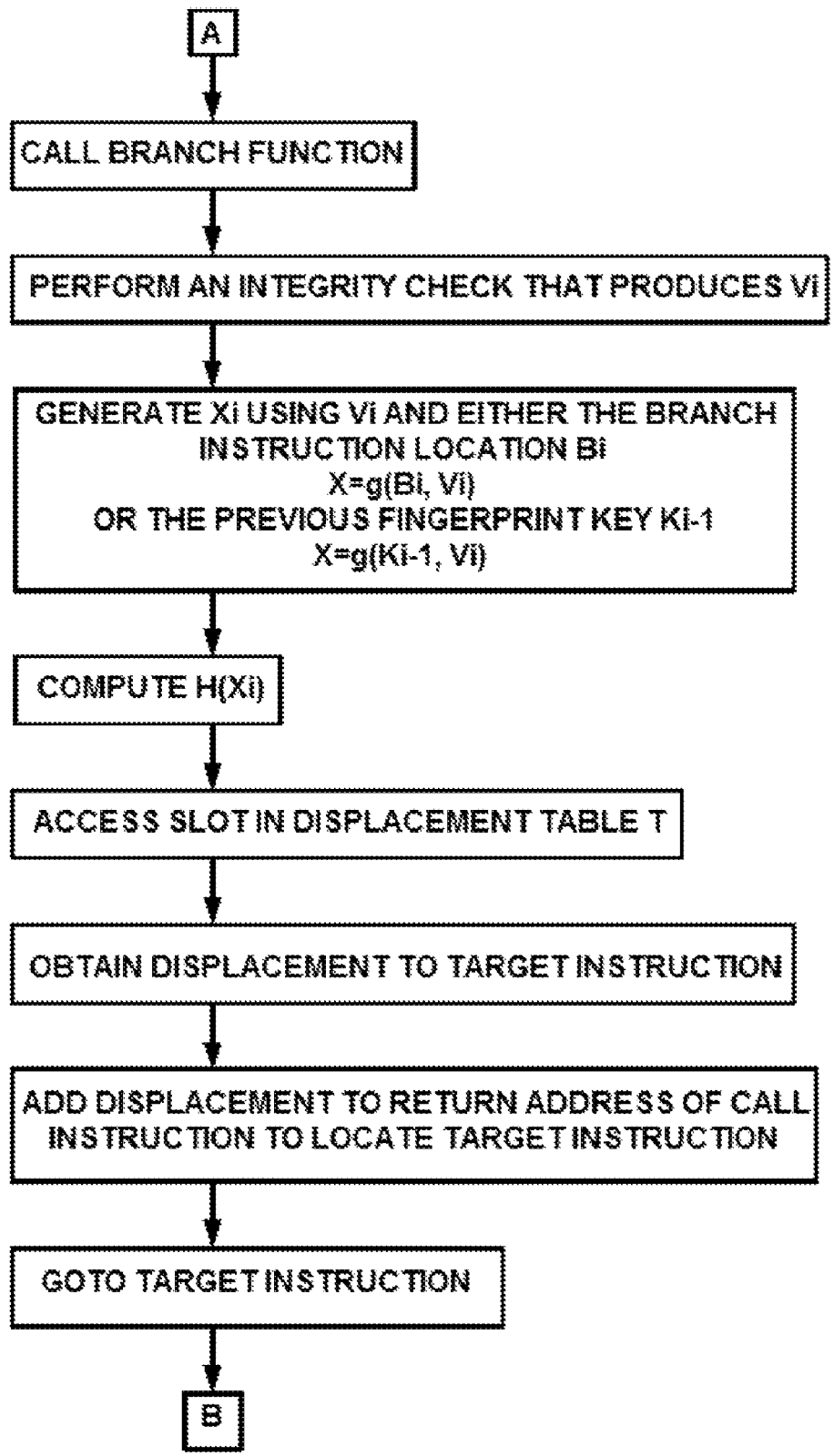
Figure 9:
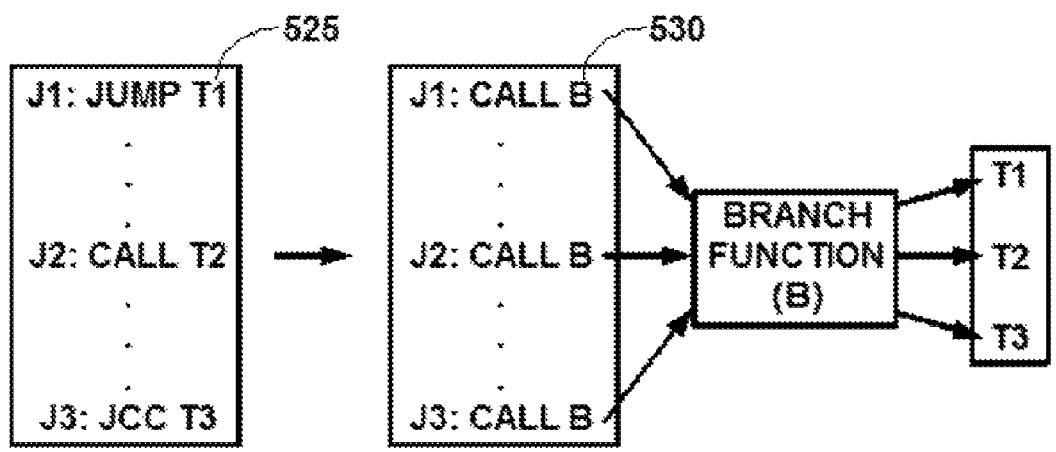
FIG. 9 is a prior art diagram illustrating transformation of a branch instruction to a call to a branch function by the piracy protection system of FIGS. 5 and 6.
Figure 10:
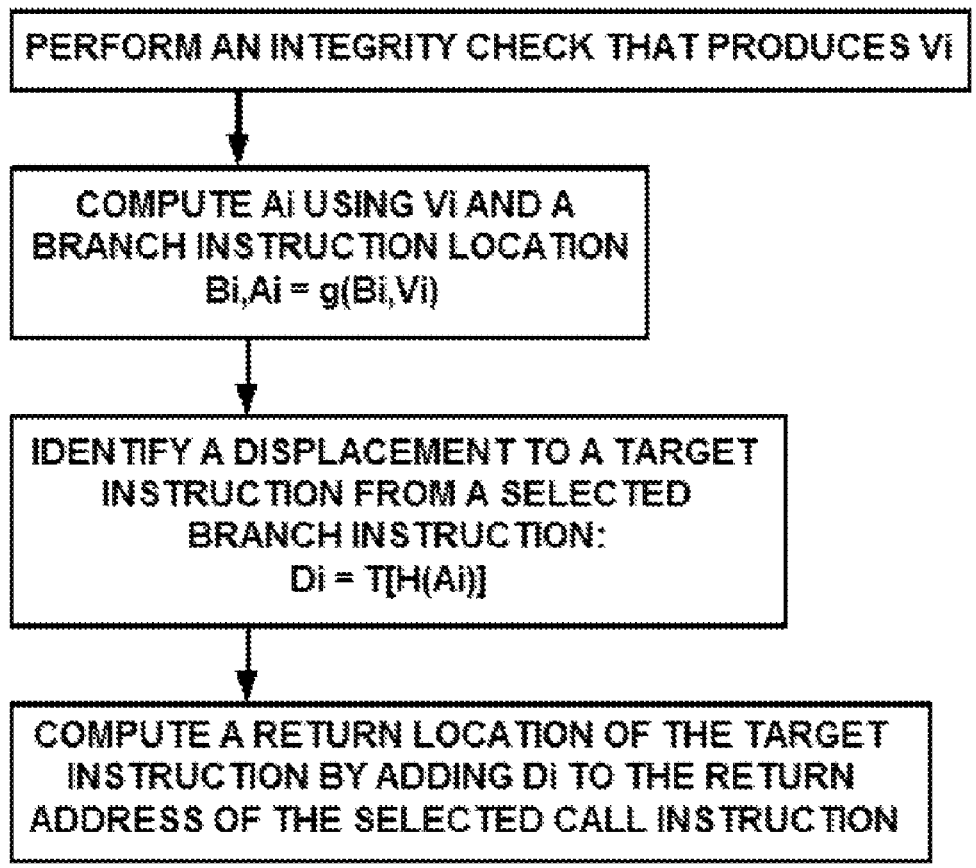
FIG. 10 is a prior art process flow diagram illustrating a method of operation of an integrity check module of the piracy protection system of FIGS. 5 and 6.
Figure 11A:
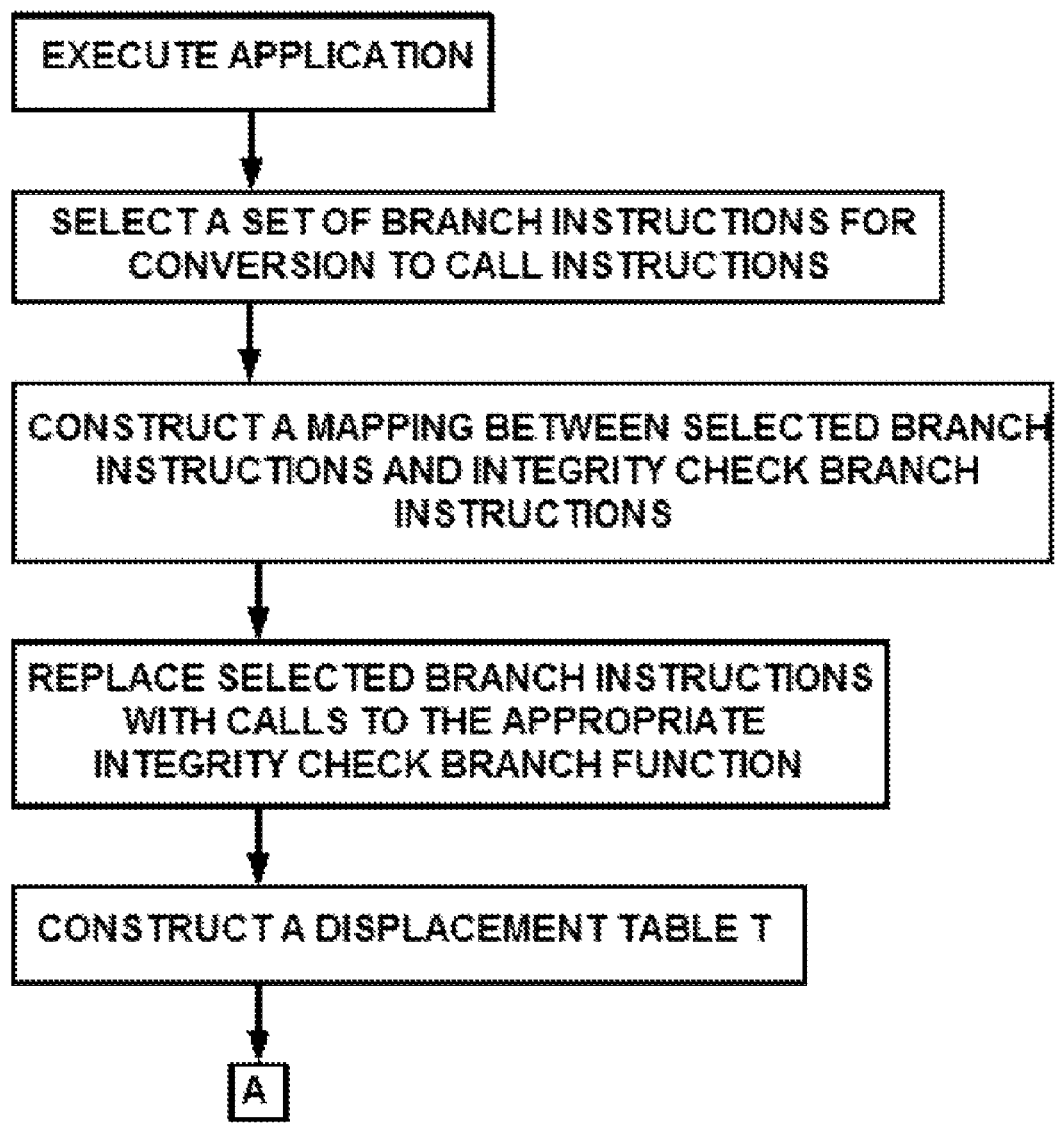
FIG. 11 is comprised of FIGS. 11A and 11B and represents a prior art process flow diagram of the piracy protection system of FIGS. 5 and 6 in inserting an integrity check module in a protected copy of an application.
Figure 11B:
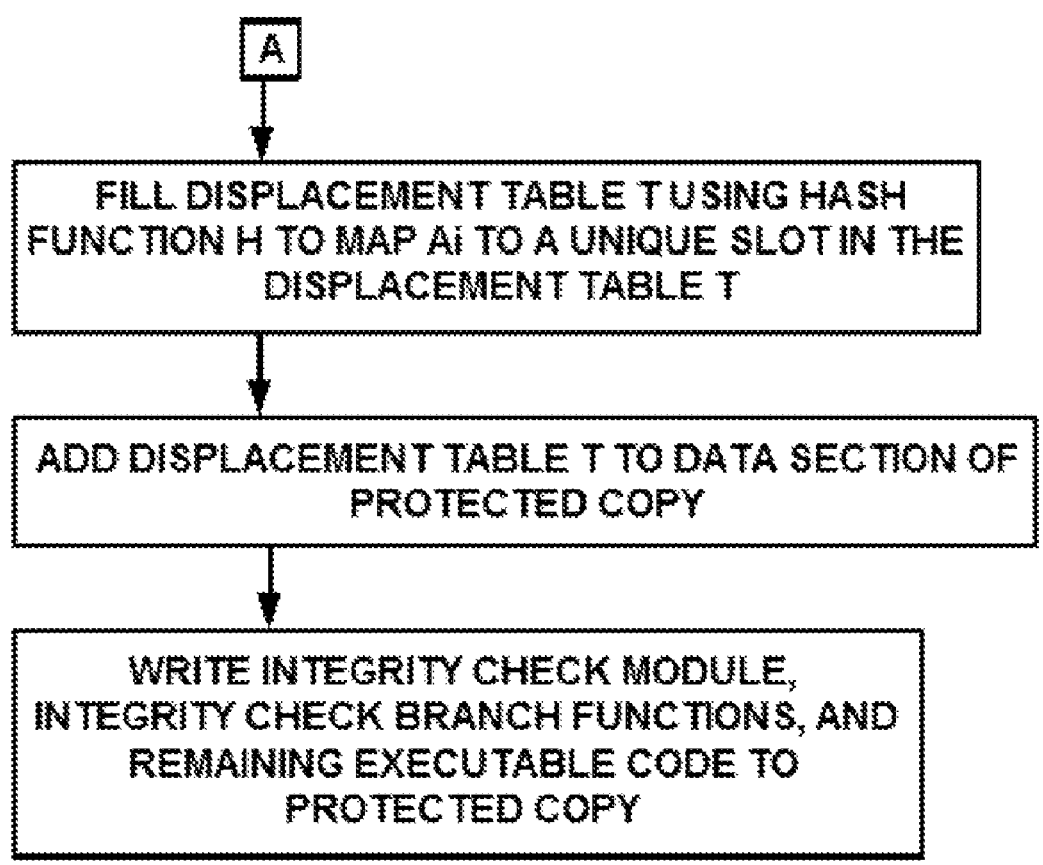
Figure 13:
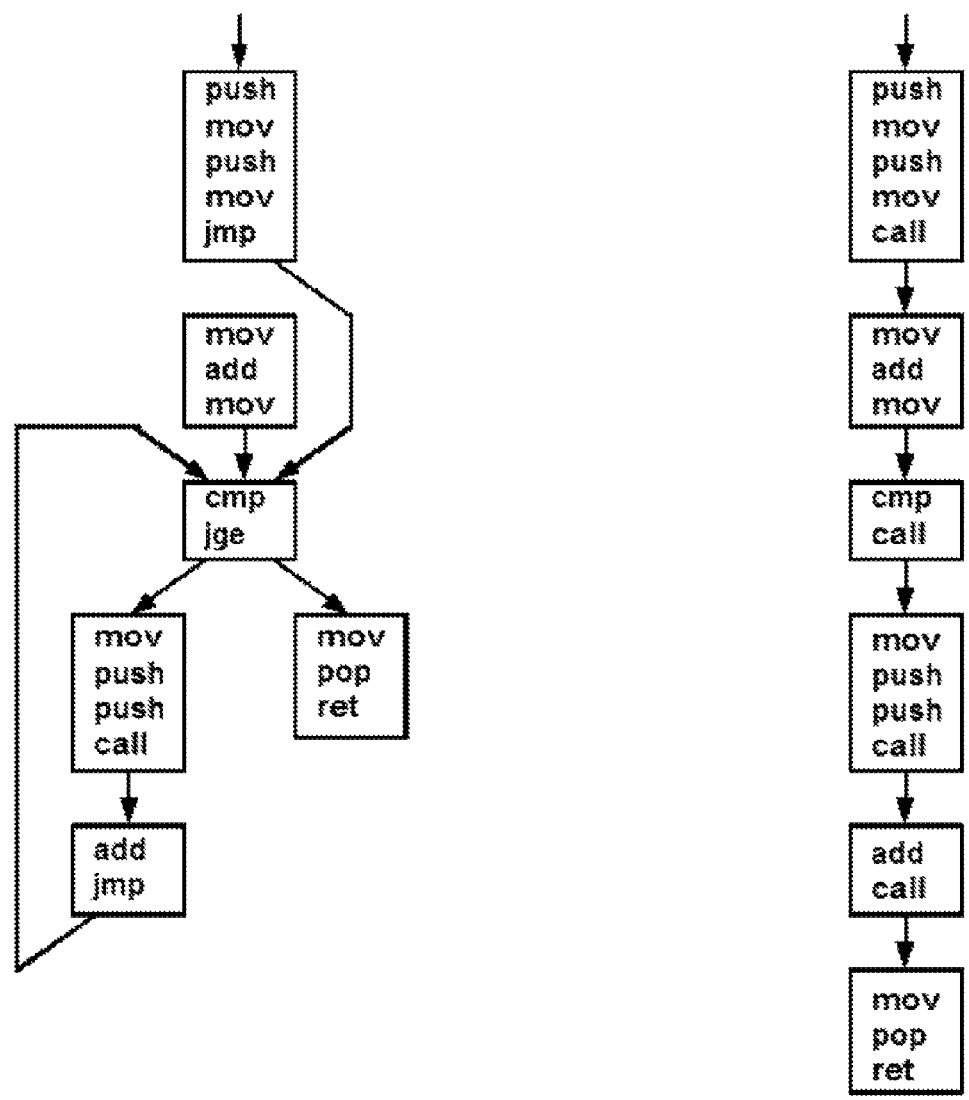
FIG. 13 is a prior art diagram illustrating an exemplary control flow for the original code of FIG. 12 and an exemplary protected control flow graph for the protected code of FIG. 12 as generated by the piracy protection system of FIGS. 5 and 6.
Figure 14:
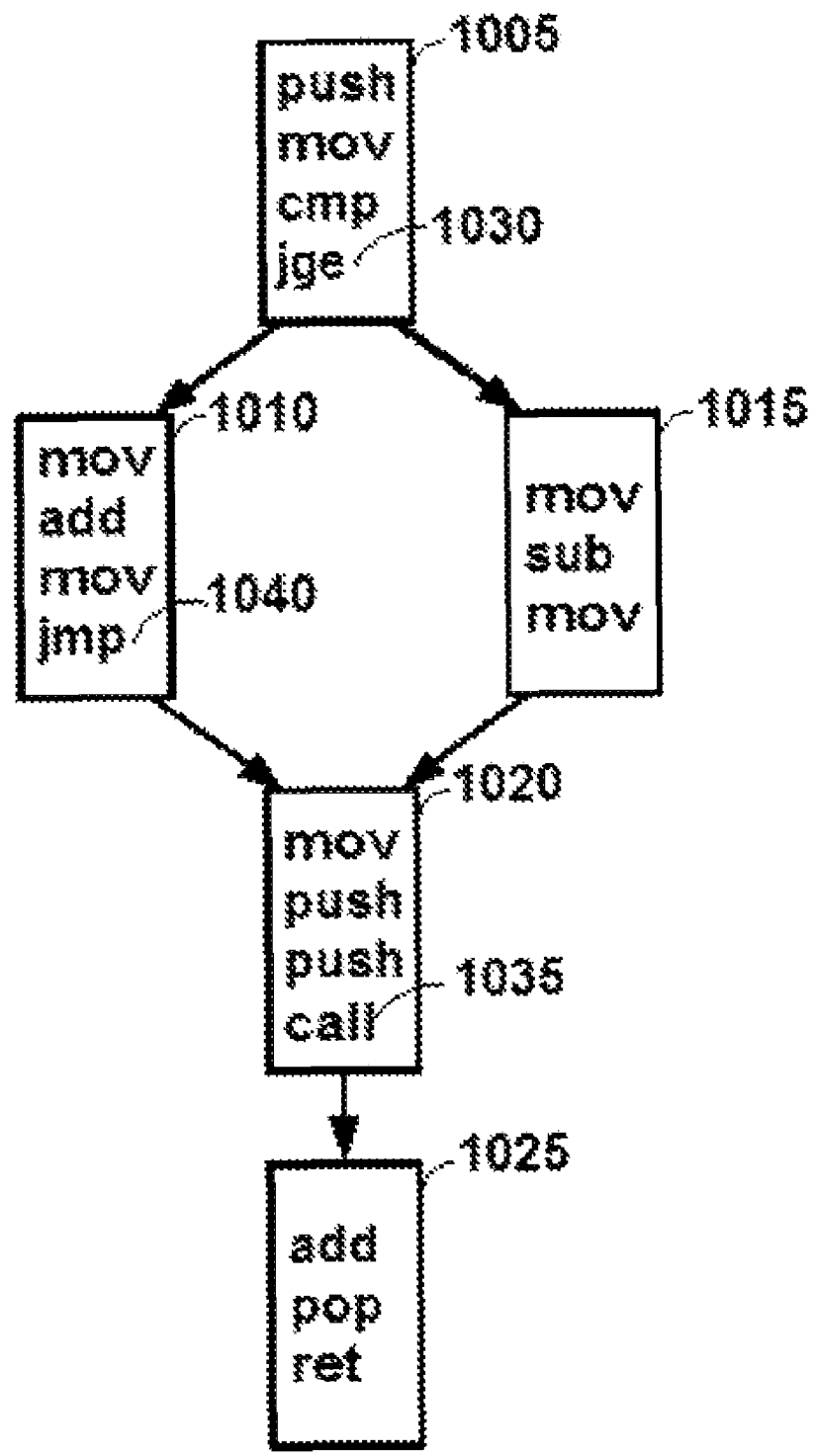
FIG. 14 is a prior art exemplary control flow graph illustrating deterministic and non-deterministic branch paths, wherein deterministic branch paths are used by the piracy protection system of FIGS. 5 and 6 to generate a fingerprint mark in the protected copy.
Figure 15:
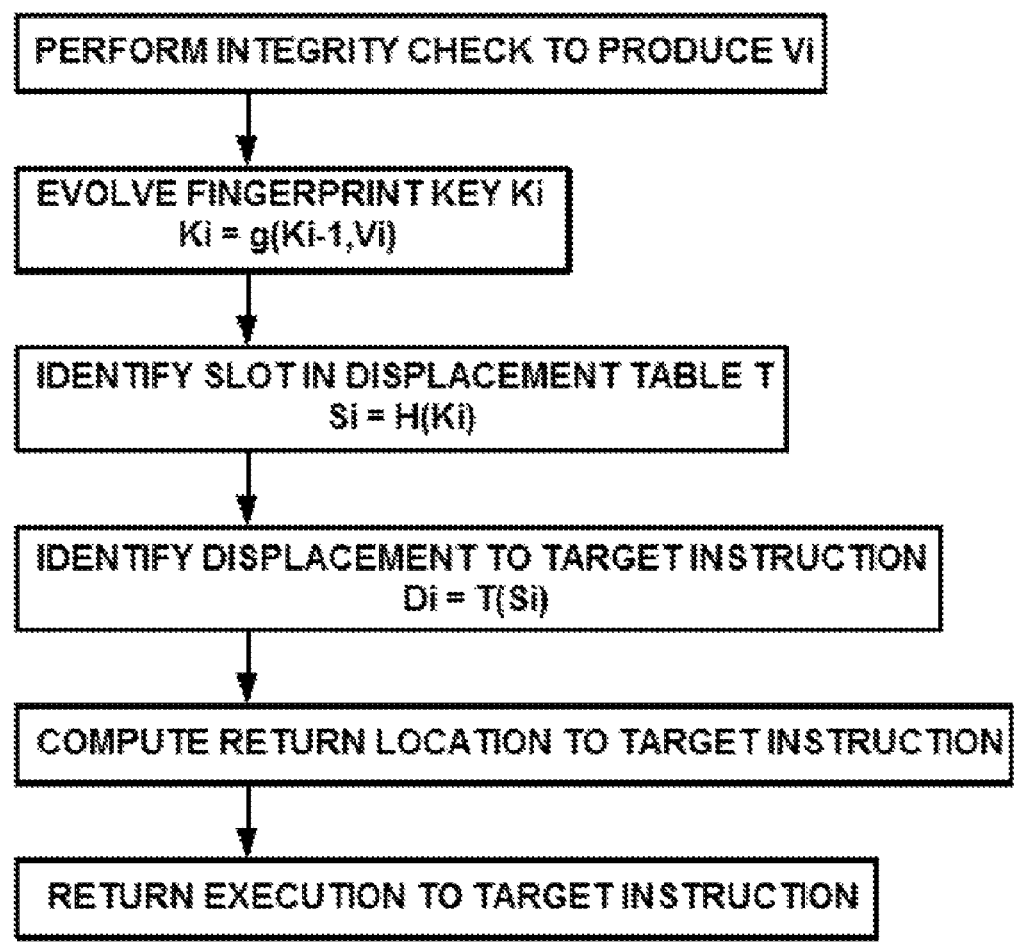
FIG. 15 is a prior art process flow chart illustrating a method of a fingerprint function of the piracy protection system of FIGS. 5 and 6 in evolving a fingerprint key.
Figure 16:
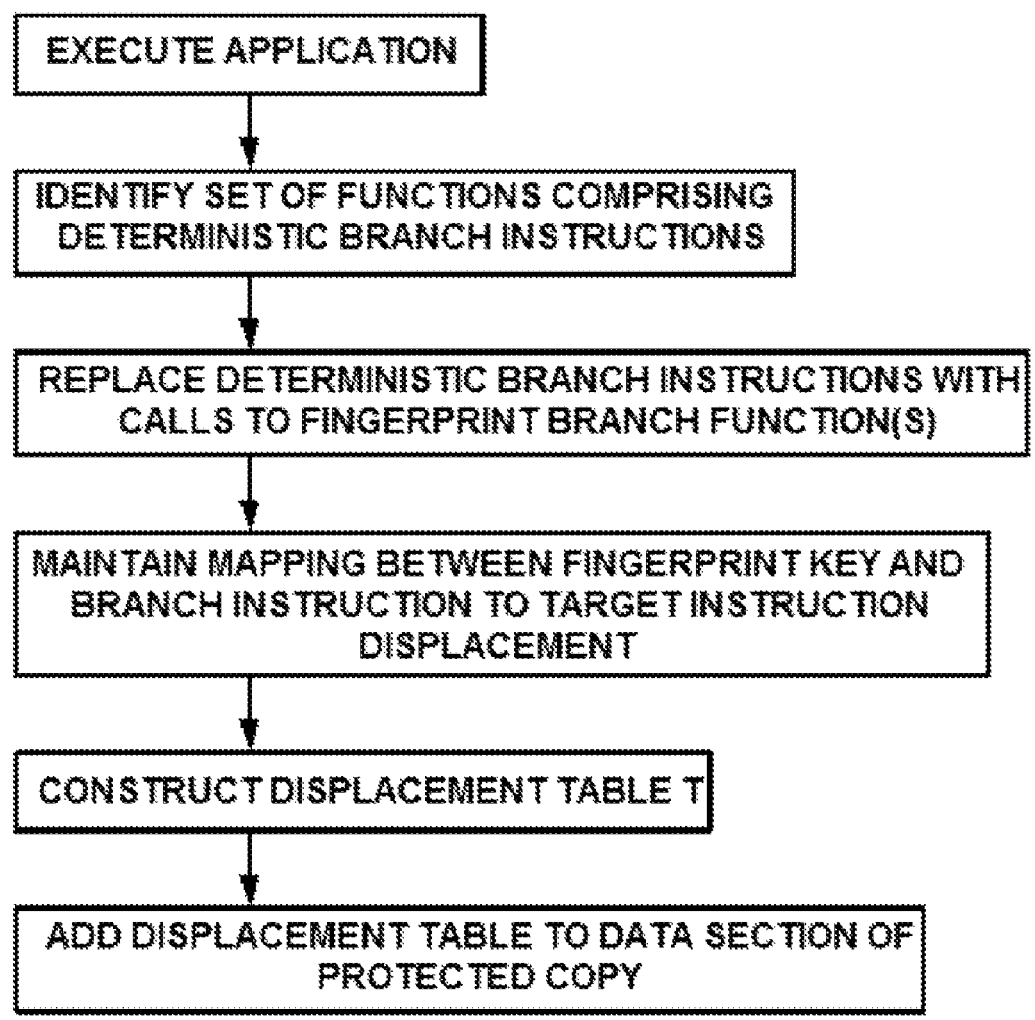
FIG. 16 is a prior art process flow chart illustrating a method of the piracy protection system of FIGS. 5 and 6 in embedding an authorship mark or a fingerprint mark in a protected copy of an application.
Figure 17:
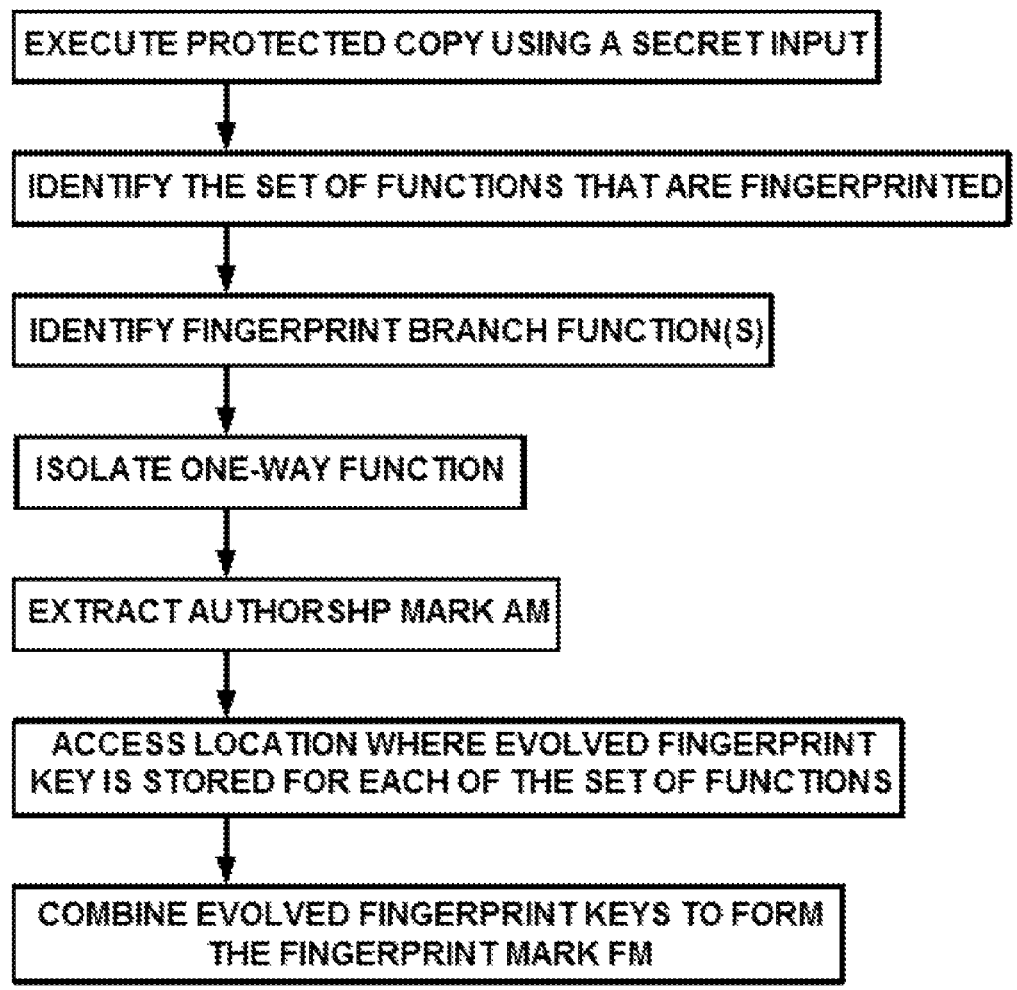
FIG. 17 is a prior art process flow chart illustrating a method of operation of the piracy protection system of FIGS. 5 and 6 in recognizing an authorship mark or a fingerprint mark embedded in a protected copy of an application.

One of the practical restrictions on the '130 invention is that key evolution needs to occur only in a deterministic way, i.e. integrity checks are restricted to only those points on an execution path through an application's executable code that is executed each time the application is executed. This limitation renders it unnecessary for the '130 invention to record the individual integrity check values in the log, so the log can be kept to a reasonable size. Due to the deterministic key evolution behavior constraint, it is already known which integrity check values should be in the log and in which order. Thus, to detect tampering in this situation, it is sufficient to simply transmit the final key $k_n$ to the clearinghouse for comparison. The '934 invention uses a similar technique to provide offline tamper detection to protect the watermark.

In contrast, the present invention instead provides a generic technique to produce a limited total number of valid keys. The invention chooses a one-way function such that all valid key values form a subgroup. In the absence of tampering, the key values will always stay within the group. However, if the program is altered, the key will evolve incorrectly and will no longer be a member of the subgroup. Once the key value is outside of the group, it is not possible to return it to the group. Thus the invention provides the technical effect that the key evolution points are not restricted to locations along the deterministic path. This makes it possible to use the key in various novel ways to regulate the program's behavior, including in non-deterministic execution paths. A non-deterministic path is not necessarily executed each time the application is executed, such as, for example, portions of the executable code that reside in an if statement or an else statement.

Additionally, the initial key $k_0$ is protected so that if tampering occurs the program cannot be restarted; however, the invention does allow users to restart the program when the program crashes because of innocent user error. In the present invention, each copy of the software is assigned a unique initial key $k_0$. The key value is evolved as the program executes using a one-way function based on the previous key and an integrity check. For example, $k_{i+1}=\text{SHA1}(k_i\|v_i)$. The new key value always overrides the old value and the old value is irretrievable, i.e. knowing $k_{i+1}$ and $v_i$ does not allow the calculation of $k_i$. This newly calculated key value is then used to control future program behavior. If the key value is calculated incorrectly for any reason, the program ultimately will behave incorrectly. The scenarios below illustrate a variety of embodiments in which the key is used to control program behavior.

In a first embodiment, the correct key value can be transformed into an invariant in the program. If the key evolves incorrectly, the transformation will yield an incorrect constant value which will adversely affect program behavior.

In a second embodiment, the program can use the key value to encrypt some crucial code, so only the correctly calculated key can decrypt the code correctly for proper program execution.

In a third embodiment, a more obfuscation-oriented approach uses the key value in a branch function to determine the correct target address. If the key value is wrong, the program will jump to an incorrect target address and the program will ultimately execute incorrectly.

In a fourth embodiment, methods in the program are grouped into clusters based on a similarity measure. In each cluster, a representative method is chosen and edits scripts that are created to transform the representative method into the other methods. The protected program only includes the representative methods and the edit scripts. The key value is used to select the proper edit script.

Alternately, the invention may employ any combination of these embodiments together.

Incorporation of the tamper detection mechanism involves modifying the instructions in the program. Depending on the type of mechanism, different modifications will be required. It may also be necessary to add a table or graph that aids in the correct use of the valid keys. For example, an entry in the table can contain the correct constant used in the program, and another entry can contain the encryption key for a block of code, and yet another entry contains the right branching address. To access a slot in the table, the key value is hashed. The resulting value is the index into the table. Any tamperproofing transformation which uses the key evolution to control program behavior is within the scope of the invention. It is desirable for various tamperproofing approaches to be used in the same application. By avoiding the constraint that key evolution is limited to a deterministic execution path, the present invention provides a generic and unified way to enable various tamperproofing transformations to be used in the same application.

One way to predetermine a limited number of valid key values is to limit the location of integrity checks and key evolution to only those points that exist on all execution paths, as in the prior art examples discussed earlier. Note this restriction eliminates the use of points inside a loop or in any conditional branch. The deterministic behavior makes it possible to calculate the correct values, but limits the applicability of the tamper resistance. Requiring key evolution to only occur along a deterministic path may be too restrictive in some cases.

The present invention allows more flexibility in choosing integrity check and key evolution points in the program. This more flexible scheme uses a one-way function such that each key value is constrained to be a member of a subgroup. A sample subgroup function can be like this: $k_{i+1}=k_i v_i \pmod{pq}$ where p and q are large primes and initial key value $k_0$ is a value in the subgroup (e.g., of the format of $g^a$). A valid $v_i$ can always be transformed into a value in the subgroup in the format of $g^b$. In the absence of tampering, the key evolution will always stay within the group. However, if the program is altered, the key will evolve incorrectly and will no longer be a member of the subgroup. Once the key value is outside of the group it is not possible to return it to the group.

Through the use of this technique, the key evolution points are not restricted to locations along the deterministic path, because the key evolution sequence isn't what's determining whether key values are valid. By eliminating the deterministic requirement, the same program point on different executions of the program could have several valid key values. Thus the tamper detection mechanism must be able to handle the variations. For example, if the scheme transforms the key value into a valid constant in the program then the mechanism will need to perform a different transformation on the different key values in order to create the same correct constant value.

If the program requires the use of a table, it may be necessary to use multiple tables. Each table will correspond to one valid key value in the subgroup. It is preferable for different tamper detection mechanisms to be used at different locations throughout the same application. The same valid key value can be created at any check point and used in the different tamper detection mechanisms. The table corresponding to each valid key value contains the usage of the particular key value at the check point for the different tamper detection mechanisms.

During implementation, the key value is perfectly hashed and the result determines which table should be accessed. Similarly, the point at which the integrity check is performed can also be perfectly hashed, and the result determines the index to look up in the table. For example, suppose the integrity check is done at point $y$ and the resulting key value is $x$. The value $x$ is hashed into number $i$. The value $y$ is hashed into number $j$. Then the usage of the key, which can be a program constant, or an encrypting key, or a branching address, can be found at entry number $j$ from table number $i$.

When using the subgroup, care must be taken to make sure that hackers cannot restore back to the previous key value, to achieve forward security in the key evolution process. For example, suppose tampering occurs and the integrity check value u is a wrong value; transforming the wrong value u will give a result v' not in the subgroup (no longer in the format of $g^b$). Additionally, the key is evolved from a valid key $k_i$ to be an invalid $k'_{i+1}$. However, the hackers can perform $k'_{i+1}$*inverse(v'), and get the previous valid $k_i$. To prevent this, the present invention destroys the value v' from the memory after it is calculated. In other words, before time t, the integrity check value is calculated, then at time t it is used to evolve the key, then after time t the integrity check value is deleted irretrievably. The only way to recalculate the value u again is to restart or loop back to those points, but because the hackers do not have any valid key at hand, they cannot loop back, and they cannot even restart the program, as will be described below. This maintains the forward security property.

A program will often need to be restarted multiple times. When the valid keys form a subgroup, there is no need to do anything special to protect initial key $k_0$. In this case, there are multiple tables available, and each table corresponds to one valid key value in the subgroup. As long as the user has a valid key, he can always execute the program from the beginning again. One way to further strengthen this approach is to put the key value into secure tamper resistant hardware, such as a "trusted computing" chip, and overwrite the old value with the new one.

The present invention can also protect the forward security property induced by the one-way function. Without this protection, using a one-way function does not provide any additional protection than a non-one-way function.

Subgroup Extension Details

As described above, a major limitation common to both the Event Log and Branch-Based techniques is the need for a deterministic path. To eliminate this restriction and allow a more flexible selection of program points, the use of a more specific category of one-way functions is proposed. These one-way functions adhere to the principles of group theory [7], that is, each key value produced using the one-way function will yield another key within the same subgroup.

Definition 1 (Group). Let G be a nonempty set together with a binary operation (G,*). We define G as a group under this operation if the following three properties hold:
1. Associativity—For every a, b, c that are elements in the set G such that (a*b)*c=a*(b*c).
2. Identity—There exists at least one e that is an element in the set G such that for every a that is an element in the set G such that a*e=e*a=a.
3. Inverse—For every a that is an element in the set G, there exists at least one b that is an element in the set G such that a*b=b*a=e.

The subgroup extension implementation has very little effect on the overall design of the Event-Log and Branch-Based tamper resistance techniques. The fundamental idea is to simply replace the one-way function used in the original techniques with a one-way function based on group theory. With this modification, untampered key evolution will occur inside a defined group.

To illustrate consider the integer group $Z_{13}=\{1, 2, \ldots, 12\}$ which is generated by the element 2, i.e. $\{2^i | i=0, 1, \ldots,$ $11\}=Z_{13}^*$. A commonly used one-way function is modular exponentiation. When applied to straight-forward key evolution in the group $Z_{13}^*$ one computes $k_{i+1}=2^{k_i} \pmod{13}$. As the key evolves under this function each value will be an element in $Z_{13}^*$. For example, let $k_0=1$, the evolution will be:

$$k_1=2^1 \pmod{13}=2$$

$$k_2=2^2 \pmod{13}=4$$

$$k_3=2^4 \pmod{13}=3$$

$$k_4=2^3 \pmod{13}=8$$

$$k_5=2^8 \pmod{13}=9$$

... etc. ...

This particular application of the modular exponentiation one-way function may appear to leak information to the attacker and therefore not be one-way. However, this scheme operates under the assumption that the attacker does not know the value of i, just like the value of x is unknown to an attacker in $f(x)=g^x \pmod p$. This is a legitimate assumption since if the attacker has been able to monitor the key evolution process to the extent that i is known, then the value of $k_i$ would also be known. Therefore the protection mechanism could be circumvented without breaking the key generation function.

In both the Event Log and Branch-Based techniques, key evolution should be linked with integrity verification. The function used above to illustrate group based key evolution does not accommodate such linkage. One possible way to address this requirement is to define the key evolution function as $k_{i+1}=k_i v_i \pmod n$ for the subgroup where $k_i$ and $v_i$ are all members of the subgroup.

In order to define a subgroup, we need to define a group first, $G=<g^i> \mod n$. We choose a subgroup H out of G. Subgroup $H=<h^i>$ where $h=g^a$, and a is divisor of phi(n). phi(n) should be a large composite that is hard to factor.

For this key-evolution function to form a subgroup, $k_0$ is defined to be $h^b \pmod n$ for some b that is an element in the integer set Z and needs to be an element in the subgroup. To satisfy the requirement on $v_j$, a transformation function can be inserted at the location of the integrity check. In the Branch-Based scheme the transformation would occur in the integrity check branch functions (ICBFs). For example the $t(v_i)$ transformation function could be defined as: $t(v_j)=v_j$ XOR $c_j$ where $c_j$ is a pre-computed constant value such as XOR $g^i$. Because the value of $v_j$ is known at tamper protect time, $c_j$ can be pre-computed constructed so as to not leak information to the attacker. Incorporating this transformation yields a final key generation function: $k_{i+1}=(k_i(v_j \text{ XOR } c_j)) \pmod n$.

In some cases, it may be necessary to further strengthen the security of the method and $c_j$ can be made to be a function of $k_i$ instead of being a constant. This way, when the key evolution goes wrong but before the program dies, even if the attacker recovers a valid integrity check value $v_j$, there is no way for him to get back to the subgroup.

In a preferred embodiment, a simple functional implementation for this would be to use XOR. For example, $C_j=k_i$ XOR entry E[i] from a table defined below. The system maintains a set of tables. For example, each integrity check value $v_j$ is associated with a table and each table is of a size equal to the number of valid keys. For the table for integrity check value $v_j$, the entry at index i is E[i]=$k_i$ XOR $c_j$ and $c_j=v_j$ XOR $g^e$ where e is an element of Integer set Z and e can be different for different entries in the table associated with $v_j$. At a point that the key needs to be evolved to $k_{i+1}$ from $k_i$ and integrity check value $v_j$, it goes to the table associated with $v_j$ and finds its entry E[i] at index i and XORs it with $k_i$ to get $c_j$.

If space is a concern, one can reduce the number of tables. Some of the integrity check values $v_j'$ may not have tables associated with them. In this case, the system needs to have a table to map the $v_j'$ to a $v_j$ which has a table.

It is important to note that given an invalid integrity check value, the transformation will yield a value outside the subgroup. When this is combined with $k_i$, the key evolution will stray outside the subgroup and will not be able to return. Additionally, to preserve the forward security, the transformed integrity check value must be deleted from memory irretrievably. This prevents attackers from restoring an invalid key back to a valid one. The above defined key evolution function also meets the one-way criteria even though each element in the group has an inverse. Knowledge of the inverse of $k_{i+1}$ does not necessarily mean that the attacker can then accurately factor that value into $k_i$ and $(v_j \text{ XOR } c_j)$.

To summarize, through the use of a subgroup-based one-way function, the key evolution points are no longer restricted to locations along a deterministic path. In the two previous techniques described, a deterministic path was required to ensure regular key evolution. For example, in the Branch-Based technique each key is associated with a particular branch location. When that branch instruction is executed there must be a guarantee that the associated key will be calculated. To ensure this, branches are selected so that they execute in a particular order. By using the subgroup extension, a particular execution order is no longer needed because it is known that the key will be one of the values in the subgroup. This, of course, implies that the same program point, on different executions of the program, could have several valid key values. This also means that the tamper detection mechanism must be able to handle the variations.

Subgroup Extension Implementation

Applying the subgroup extension to the Event Log-Based technique requires no additional implementation considerations. However, this is not true for the Branch-Based scheme which requires a somewhat minor change in how the displacement values are stored and accessed. For any replaced branch instruction, it is possible that any one of the subgroup values is generated. Because of this, it must be possible to obtain the correct branch, target displacement using each of the keys in the subgroup.

Figure 18:
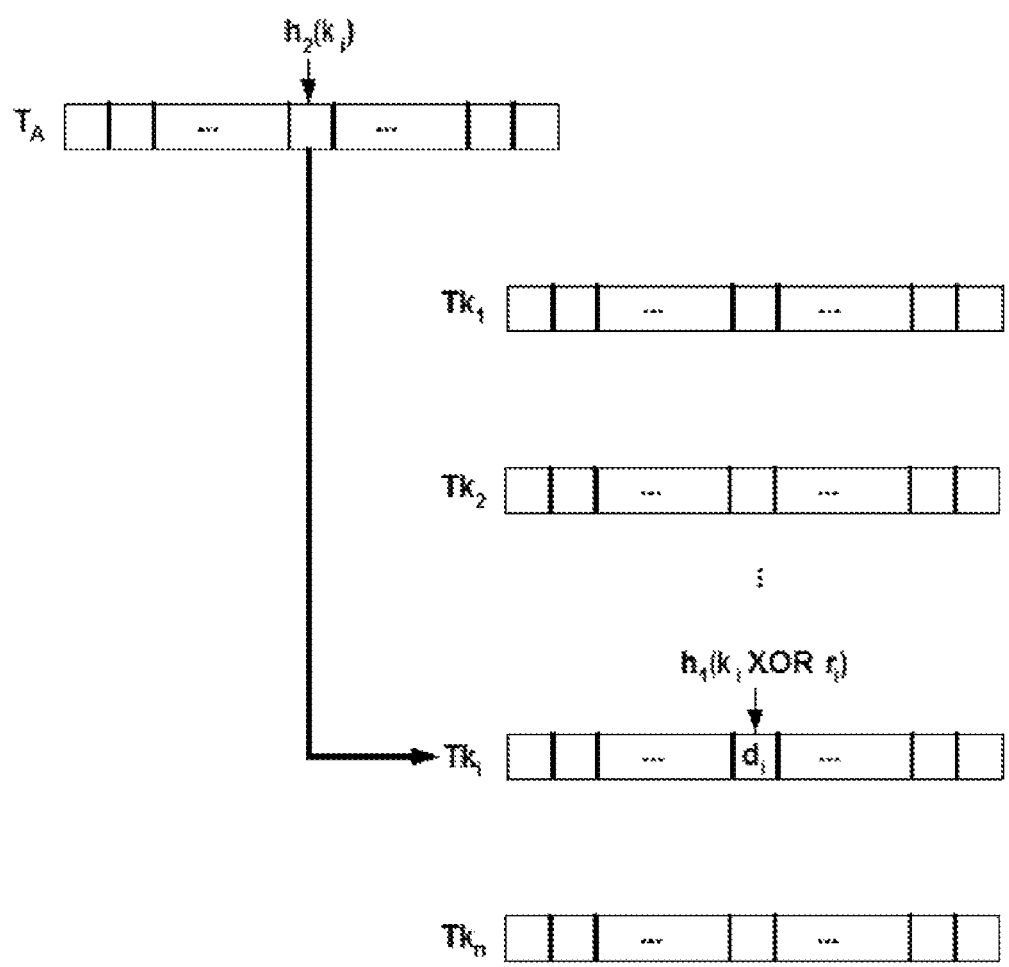
FIG. 18 is a diagram of the layout of and the relationship between the different tables in the present invention.

One way to accomplish this is to create a displacement table for each key value. So if the subgroup was of size seven there would be seven different displacement tables. Each displacement table contains a single entry for each replaced branch instruction. These displacement values are organized in the table such that $Tk_i[h_1(k_i \text{ XOR } r_i)]=d_i$ where $Tk_i$ is the table associated with key $k_i$, $r_i$ is the return address on the stack when the ICBF is called, and $h_1$ is a perfect hash function. In order to identify which displacement table to access, one more table is added. This table contains a single entry for each key value. In the slot associated with a particular key is the address of the associated displacement table. The table is organized such that $T_A[h_2(k_i)]=\text{addressOf}(Tk_i)$ where $h_2$ is a different perfect hash function. FIG. 18 illustrates the layout of and relationship between the different tables.

This entire change is incorporated by replacing step 3 in the ICBF with this process. Other than changing the particular one-way function used, the remainder of the Branch-Based algorithm remains the same. In summary, the subgroup based ICBF performs the following tasks:
1. An integrity check producing the value $v_i$.
2. Computation of the new key $k_{i+1}$ using $v_i$ and the current key $k_i$, e.g. $k_{i+1}=(k_i(v_i \text{ XOR ci}))(\text{mod } n)$
3. Identification of the proper displacement table addressOf $(Tk_{i+1})=T_A[h_2(k_{i+1})]$ 4. Identification of the displacement to the target via $v_{i+1}=Tk_{i+1}[h_1(k_{i+1} \text{ XOR } r_{i+1})]$
5. Computation of the intended target (the return address) by adding the displacement $d_{i+1}$ to the return address $r_{i+1}$ on the stack.

Subgroup Extension Analysis

The subgroup extension builds on the capabilities of the Event Log-Based and Branch-Based techniques. Because of this, at a minimum, it provides all of the same advantages and protections provided by the basic schemes. For example, the extension still prevents an adversary from altering the program through manual modification or through the use of an automated tool like a code obfuscator. Such program modification will still be detected through an incorrectly computed value using the one-way function.

Additionally, because the tamper resistance mechanism is based on runtime information, static analysis tools alone will not be enough to reverse engineer the software. In order to completely reverse engineer the program an attacker will be forced to use either a hybrid static-dynamic attack or a completely dynamic attack. However, like the original techniques, many forms of dynamic analysis can be prevented through properly constructed integrity checks.

In addition to the original strengths, the subgroup extension eliminates the deterministic path weakness common to both the Event Log-Based and the Branch-Based techniques. This has the effect of increasing the analysis required by the attacker. A non-deterministic execution path leads to a non-deterministic key evolution. This implies that the same program point on different executions of the program could end up with different value, thus complicating any analysis.

The flexibility afforded by the subgroup extension also increases the number of program points which can be selected. The strength of the Branch-Based scheme is partially based on the number of branches which are eligible for conversion. The greater the number of converted branches, the more attacker analysis is required. Easing the deterministic path restriction means that any branch in the program could be converted. Now the selection of branches is only restricted by performance considerations.

Finally, the subgroup extension eliminates the initial key weakness in the original Branch-Based scheme. The original technique requires predictable key evolution which necessitates the use of the same initial key each time the program is executed. Such a restriction threatens the forward security property. With the subgroup extension any valid key can be used to restart the program eliminating the reliance on secure computing devices like the TPM.

Experimental Results

An analysis of the proposed subgroup extension to the Branch-Based tamper resistance technique is provided below. With a goal of comparing the experimental results with those presented by Jin, et al. [10] the implementation is based on the details provided in the original paper and the experimental setup is replicated. Less overhead was needed than anticipated.

A prototype implementation was created for protecting Windows executable files. All experiments were run on a 1.8 GHz Pentium 4 system with 512 MB of main memory running Windows XP Professional. To evaluate the overhead incurred by the scheme, eleven of the twelve applications in the SPECint-2000 benchmark suite were used. Due to limitations of the pre-processing tool, applications written in C++ could not be processed and thus eon could not be used. The benchmark applications were compiled using Microsoft's Visual Studio 6.0 with optimizations disabled. Additionally, the flag –D_Console was used. This has the effect of decreasing the overall number of branch instructions but yields well defined functions to simplify prototype development.

As previously described, the class of proposed one-way functions is composed of subgroups of different sizes. In order to examine the effects different size subgroups could have on program performance and size, six different one-way functions were selected. Each function generates a subgroup of a different size defined by $g^i(\bmod n)$ where i is an element in the integer set Z and n is prime. Details pertaining to the subgroups can be seen in Table 1.

The overall performance of the protected program was evaluated using the SPEC reference inputs. The execution times reported were obtained through 5 runs. The highest and lowest values were discarded and the average was computed for the remaining three runs. To add the tamper detection capabilities, functions were selected randomly throughout the application. The overall number of branches used in the tamper detection for each program is reported in the results.

For each of the six subgroups the performance overhead was virtually identical. Table 2 illustrates the overall performance for the original programs and the tamper resistance versions using subgroup G2. Very little performance penalty is incurred due to the tamper resistance mechanism for nine of the eleven applications. However, both crafty and parser suffer from a rather significant slowdown. Because these results differed so drastically, the cause was investigated. Some of the functions modified were part of what could be considered hot spots. This has a compounding effect on what normally would only be a minimal function call overhead. Because the branch selection is far more flexible under the subgroup extension, profiling can be used to identify branches contained in hot spots. Such analysis can minimize performance impact without decreasing the strength of the technique.

The majority of the space increase incurred by the subgroup extension to the Branch-Based algorithm is due to the multiple tables added to the data section of the binary. Each time the branch function executes, the correct target instruction must be identified no matter which key in the subgroup is generated. This means that the number of displacement tables contained in the program must equal the size of the group. Additionally, another table must be maintained to identify the correct displacement table.

The size of these tables will obviously be dictated by the number of replaced branches and the size of the subgroup. However, the size will be more significantly influenced by the type of perfect hash function used to distribute the values in the tables. A perfect hash function only guarantees that each key value will hash to a unique slot in the table, so the table could be quite sparse. On the other hand, a minimal perfect hash function goes further by guaranteeing that the table will be as small as possible, i.e. that the size of the table will be as close to the number of items being stored as possible. Because of this a naïve hash function will create a much larger table than a minimal one. Tables 3 and 4 illustrate the significant difference the choice in perfect hash function can have on the size impact. In Table 3, a naive perfect hash function was used, and a near minimal perfect hash function was used in Table 4. The naive function resulted in size increases which will almost always be unacceptable even for small subgroups. On the other hand, a near minimal function produces rather tolerable size increases even as the size of the subgroup increases.

A general purpose computer is programmed according to the inventive steps herein. The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the invention has been described with respect to illustrative embodiments thereof, it will be understood that various changes may be made in the apparatus and means herein described without departing from the scope and teaching of the invention. Accordingly, the described embodiment is to be considered merely exemplary and the invention is not to be limited except as specified in the attached claims.

TABLE 1

The six different subgroups used to evaluate the subgroup extension to the Branch-Based algorithm. The members of the subgroup are defined by $g^i(\bmod n)$ where $i \in Z$ and n is prime.

| Subgroup | Generator | Modulus | Size |
| --- | --- | --- | --- |
| $G_1$ | 207 | 4429 | 7 |
| $G_2$ | 216 | 2881 | 11 |
| $G_3$ | 163 | 589 | 15 |
| $G_4$ | 97 | 1333 | 35 |
| $G_5$ | 64 | 2077 | 55 |
| $G_6$ | 520 | 3397 | 91 |

TABLE 2

Effect of incorporating Branch-Based tamper resistance with the subgroup extension on execution time using subgroup $G_2$ with a size of 11.

| | | Execution Time (sec) | | |
| --- | --- | --- | --- | --- |
| Program | Branches | Original ($T_0$) | Protected ($T_1$) | Slowdown ($T_1/T_0$) |
| gzip | 348 | 434.74 | 433.16 | −0.36% |
| vpr | 665 | 509.76 | 543.29 | 6.58% |
| gcc | 1243 | 261.35 | 259.98 | −0.52% |
| mcf | 54 | 558.87 | 558.04 | −0.15% |
| crafty | 173 | 316.41 | 855.62 | 170.41% |
| parser | 444 | 517.10 | 1507.88 | 191.60% |
| perlbmk | 272 | 484.72 | 489.98 | 1.08% |
| gap | 572 | 333.42 | 333.5 | 0.02% |
| vortex | 398 | 325.38 | 338.49 | 4.03% |
| bzip2 | 156 | 844.99 | 836.78 | −0.97% |
| twolf | 470 | 937.13 | 946.23 | 0.97% |

TABLE 3

Program size increase using a naïve perfect hash function to distribute the values in the tables.

| Program | Branches | Program Size Increase | | | | | |
|---|---|---|---|---|---|---|---|
| | | $G_1$ | $G_2$ | $G_3$ | $G_4$ | $G_5$ | $G_6$ |
| gzip | 348 | 475% | 1092% | 1196% | 3362% | 5508% | 9108% |
| vpr | 665 | 937% | 1471% | 1684% | 3984% | 7337% | 12137% |
| gcc | 1243 | 201% | 315% | 367% | 997% | 1806% | 3079% |
| mcf | 54 | 56% | 106% | 150% | 337% | 525% | 863% |
| crafty | 173 | 70% | 127% | 104% | 338% | 635% | 1049% |
| parser | 444 | 558% | 1047% | 978% | 2308% | 5216% | 8626% |
| perlbmk | 272 | 63% | 98% | 117% | 273% | 489% | 809% |
| gap | 572 | 152% | 238% | 324% | 756% | 1187% | 1963% |
| vortex | 398 | 134% | 265% | 270% | 628% | 1320% | 2184% |
| bzip2 | 156 | 138% | 214% | 290% | 671% | 1052% | 1738% |
| twolf | 470 | 370% | 595% | 613% | 1913% | 3041% | 5030% |

TABLE 4

Program size increase using a minimal perfect hash function to distribute the values in the tables.

| Program | Branches | Program Size Increase | | | | | |
|---|---|---|---|---|---|---|---|
| | | $G_1$ | $G_2$ | $G_3$ | $G_4$ | $G_5$ | $G_6$ |
| gzip | 348 | 20% | 27% | 29% | 58% | 85% | 135% |
| vpr | 665 | 13% | 18% | 23% | 48% | 73% | 119% |
| gcc | 1243 | 2% | 4% | 5% | 11% | 17% | 28% |
| mcf | 54 | 10% | 14% | 16% | 20% | 26% | 36% |
| crafty | 173 | 6% | 6% | 6% | 12% | 16% | 23% |
| parser | 444 | 13% | 18% | 22% | 45% | 67% | 108% |
| perlbmk | 272 | 2% | 2% | 3% | 6% | 8% | 14% |
| gap | 572 | 3% | 4% | 5% | 10% | 16% | 26% |
| vortex | 398 | 3% | 4% | 5% | 10% | 15% | 30% |
| bzip2 | 156 | 10% | 13% | 15% | 30% | 43% | 68% |
| Twolf | 470 | 6% | 8% | 10% | 23% | 34% | 56% |

APPENDIX

[1] I D. Aucsmith. Tamper resistent software: An implementation. In First International Information Hiding Workshop, pages 317-333, 1996.

[2] H. Chang and M. J. Atallah. Protecting software code by guards. In ACM DRM workshop, pages 160-175, 2001.

[3] Y. Chen, R. Venkatesan, M. Cary, R. Pang, S. Sinba, and M. Jakubowski. Oblivious hashing: A stealthy software integrity verification primitive. In Proceedings of the 5th Information Hiding Workshop, pages 400-414, 2002.

[4] C. Collberg, G. Myles, and A. Huntwork. Sandmark—a tool for software protection research. IEEE Security and Privacy, 1(4):40-49, July/August 2003.

[5] C. Collberg and C. Thomborson. Software watermarking: Models and dynamic embeddings. In Conference Record of POPL '99: The 26th ACM SIGPLAN-SIGACT Symposium on Principles of Programming Languages (January 1999), 1999.

[6] C. Collberg, C. Thomborson, and D. Low. Manufacturing cheap, resilient, and stealthy opaque constructs. In Principles of Programming Languages 1998, POPL'98, 1998.

[7] J. A. Gallian. Contemporary Abstract Algebra. Houghton Muffin Company, 2002.

[8] B. Horne, L. Matheson, C. Sheehan, and R. E. Tarjan. Dynamic self-checking techniques for improved tamper resistance. In Security and Privacy in Digital Rights Management, ACM CCS-8 Workshop DRM 2001, Philadelphia, Pa., USA, November 2001. Springer Verlag, LNCS 2320.

[9] H.Jin and J.Lotspiech. Proactive software tamper detection. In Information Security Conference, volume LNCS 2851, pages 352-365, 2003.

[10] H. Jin, G. Myles, and J. Lotspiech. Towards better software tamper resistance. In Information Security Conference, 2005.

[11] C. Kruegel, W. Robertson, F. Valeur, and G. Vigna. Static disassembly of obfuscated binaries. In Proceedings of USENIX Security, pages 225-270, 2004.

[12] D. Libes. Obfuscated C and Other Mysteries. Wiley, 1993.

[13] C. Linn and S. Debray. Obfuscation of executable code to improve resistance to static disassembly. In Proceedings of the 10th ACM Conference on Computer and Communications Security, pages 290-299, 2003.

[14] M. Madou, B. Anckaert, B. D. Sutter, and K. D. Bosschere. Hybrid static-dynamic attacks against software protection mechanisms. In DRM '05: Proceedings of the 5th ACM workshop on Digital rights management, pages 75-82. ACM Press, 2005.

[15] G. Myles and C. Collberg. Software watermarking through register allocation: Implementation, analysis, and attacks. In ICISC'2003 (International Conference on Information Security and Cryptology), 2003.

[16] G. Myles, C. Collberg, Z. Heidepriem, and A. Navabi. The evaluation of two software watermarking algorithms. Software: Practice and Experience, 35(10):923-938, 2005.

[17] J. Nagra and C. Thomborson. Threading software watermarks. In $6^{th}$ International Information Hiding Workshop, 2004.

[18] T. Sahoo and C. Collberg. Software watermarking in the frequency domain. Technical Report TR04-07, Department of Computer Science, University of Arizona, 2004.

[19] J. P. Stem, G. Hachez, F. Koeune, and J.-J. Quisquater. Robust object watermarking: Application to code. In Information Hiding, pages 368-378, 1999.

[20] P. Tyma. Method for renaming identifiers of a computer program. U.S. Pat. No. 6,102,966, 2000.

[21] S. Udupa, S. Debray, and M. Madou. Deobfuscation: Reverse engineering obfuscated code. In Proceedings of the 12th Working Conference on Reverse Engineering, pages 45-54, Pittsburgh, Pa., 2005. IEEE Computer Society.

[22] P. C. van Oorschot, A. Somayaji, and G. Wurster. Hardware-assisted circumvention of self-hashing software tamper resistance. IEEE Transactions on Dependable and Secure Computing, 02(2):82-92, 2005.

[23] R. Venkatesan, V. Vazirani, and S. Sinha. A graph theoretic approach to software watermarking. In 4th International Information Hiding Workshop, Pittsburgh, Pa., April 2001.

[24] C. Wang, J. Hill, J. Knight, and J. Davidson. Protection of software-based survivability mechanisms. In Proceedings of the 2001 International Conference on Dependable Systems and Networks, pages 193-202. IEEE Computer Society, 2001.

We claim:

1. A method for preventing offline tampering of a software program, implemented by a computer, comprising:
    evolving a unique initial key value assigned to a copy of the software program when the copy of the software program executes using an integrity check and a one-way function that produces a new key value within a chosen mathematical subgroup, such that the new key value will stay within the subgroup unless tampering to the copy of the software program occurs; and
    regulating behavior of the copy of the software program using the new key value, such that the integrity check fails if the evolved new key value is incorrect and the copy of the software program will not function correctly.

2. The method of claim 1, wherein the unique initial key is evolved at deterministic points within the copy of the software program.

3. The method of claim 1, wherein the unique initial key is evolved at non-deterministic points within the copy of the software program.

4. The method of claim 1 wherein key evolution is determined by $k_{i+1}=k_i*(\mod n)$ where phi(n) is a composite that is hard to factor and an initial key value $k_0$ is a value in the subgroup defined by $h^b(\mod n)$ where j is an element in the integer set Z and $h=g^a \pmod n$ and g is a generator for the group defined by $g^i \pmod n$ wherein $v_j$ is transformed into a member in the subgroup.

5. The method of claim 4 wherein key evolution is determined by $k_{i+1}=k_i*v_j \pmod n$ where $n=p*q$ and p and q are two large primes.

6. The method of claim 4 wherein key evolution is determined by $k_{i+1}=k_i*v_j \pmod n$, and $v_j$ is transformed into a member in the subgroup by XORing another value $c_j=v_j$ XOR $g^e$ where e is an element in Integer set Z.

7. The method of claim 6 wherein $k_{i+1}=k_i*(v_j$ XOR $c_j)$ and $c_j$ is a function of $k_i$.

8. The method of claim 7 wherein $k_{i+1}=k_i*v_j$ XOR $c_j)$ where $c_j=k_i$ XOR a value entry obtained from a table, and at table index i, the entry is $k_i$ XOR $c_j$.

9. The method of claim 1 further comprising:
    transforming the new key value into a constant in the copy of the software program, wherein program behavior is adversely affected by incorrect key evolution yielding an incorrect constant value.

10. The method of claim 1 further comprising:
    encrypting crucial code in the copy of the software program using the new key value, so only the correctly calculated key can decrypt the code correctly for proper program execution.

11. The method of claim 1 further comprising:
    determining a correct target address in a branch function using the new key value, wherein program behavior is adversely affected by incorrect key evolution yielding an incorrect target address.

12. The method of claim 1 further comprising
    selectively executing edit scripts that transform software program code for the copy of the software program, wherein program behavior is adversely affected by incorrect key evolution yielding an incorrect edit script selection.

13. The method of claim 1 further comprising:
    transforming the new key value into a constant in the copy of the software program, wherein program behavior is adversely affected by incorrect key evolution yielding an incorrect constant value;
    encrypting crucial code in the copy of the software program using the new key value, so only the correctly calculated key can decrypt the code correctly for proper program execution;
    determining a correct target address in a branch function using the new key value, wherein program behavior is adversely affected by incorrect key evolution yielding an incorrect target address; and
    selectively executing edit scripts that transform software program code, wherein program behavior is adversely affected by incorrect key evolution yielding an incorrect edit script selection.

14. The method of claim 1 further comprising:
    irretrievably deleting an integrity check value that resulted from the integrity check, to prevent future use of the unique initial key.

15. The method of claim 1, wherein if the integrity check fails, further comprising:
    recording the integrity check value in a event log, and
    transmitting the new key value and the event log to a software clearinghouse to verify that the copy of the software program has been tampered with.

16. A computer program product for preventing offline analysis and modification of software content for offline tamper resistance of software content, the computer program product usable with a programmable computer having readable program code embodied on a computer readable non-transitory storage medium therein, the readable program code comprising:
    computer readable program code configured to evolve a unique initial key value assigned to a copy of the software program when the copy of the software program executes using an integrity check and a one-way function that produces a new key value within a chosen mathematical subgroup, such that the new key value will stay within the subgroup unless tampering to the copy of the software program occurs; and
    computer readable program code configured to regulate behavior of the copy of the software program using the new key value, such that the integrity check fails if the evolved new key value is incorrect and the copy of the software program will not function correctly.

17. The computer program product of claim 16, wherein the unique initial key is evolved at deterministic points within the copy of the software program.

18. The computer program product of claim 16, wherein the unique initial key is evolved at non-deterministic points within the copy of the software program.

19. The computer program product of claim 16 wherein the evolving comprises key evolution that is determined by $k_{i+1}=k_i \, v_j \pmod n$ where phi(n) is a composite that is hard to factor and an initial key value $k_0$ is a value in the subgroup defined by $h^b(\mod n)$ where j is an element in the integer set Z and $h=g^a \pmod n$ and g is a generator for the group defined by $g^i \pmod n$ wherein $v_j$ is transformed into a member in the subgroup.

20. The computer program product of claim 19 wherein the key evolution is determined by $k_{i+1}=k_i*v_j \pmod n$ where $n=p*q$ and p and q are two large primes.

21. The computer program product of claim 19 wherein the key evolution is determined by $k_{i+1}=k_i*v_j \pmod n$, and $v_j$ is transformed into a member in the subgroup by XORing another value $c_j=v_j$ XOR $g^e$ where e is an element in Integer set Z.

22. The computer program product of claim 21 wherein $k_{i+1}=k_i*(v_j$ XOR $c_j)$ and $c_j$ is a function of $k_i$.

23. The computer program product of claim 22 wherein $k_{i+1}=k_i*(v_j$ XOR $c_j)$ where $c_j=k_i$ XOR a value entry obtained from a table, and at table index i, the entry is $k_i$ XOR $c_j$.

24. The computer program product of claim 16 further comprising:
computer readable program code configured to transform the new key value into a constant in the copy of the software program, wherein program behavior is adversely affected by incorrect key evolution yielding an incorrect constant value.

25. The computer program product of claim 16 further comprising:
computer readable program code configured to encrypt crucial code in the copy of the software program using the new key value, so only the correctly calculated key can decrypt the code correctly for proper program execution.

26. The computer program product of claim 16 further comprising:
computer readable program code configured to determine a correct target address in a branch function using the new key value, wherein program behavior is adversely affected by incorrect key evolution yielding an incorrect target address.

27. The computer program product of claim 16 further comprising
computer readable program code configured to selectively execute edit scripts that transform software program code for the copy of the software program, wherein program behavior is adversely affected by incorrect key evolution yielding an incorrect edit script selection.

28. The computer program product of claim 16, wherein if the integrity check fails, further comprising:
recording the integrity check value in a event log, and
transmitting the new key value and the event log to a software clearinghouse to verify that the copy of the software program has been tampered with.

29. The computer program product of claim 16, further comprising:
computer readable program code configured to irretrievably delete an integrity check value that resulted from the integrity check, to prevent future use of the unique initial key.

* * * * *